(12) United States Patent
Ismalon

(10) Patent No.: US 8,442,972 B2
(45) Date of Patent: May 14, 2013

(54) NEGATIVE ASSOCIATIONS FOR SEARCH RESULTS RANKING AND REFINEMENT

(75) Inventor: Emil Ismalon, Tel-Aviv (IL)

(73) Assignee: Collarity, Inc., Palo Alto, CA (US)

( * ) Notice: Subject to any disclaimer, the term of this patent is extended or adjusted under 35 U.S.C. 154(b) by 899 days.

(21) Appl. No.: 11/870,999

(22) Filed: Oct. 11, 2007

(65) Prior Publication Data

US 2008/0140643 A1    Jun. 12, 2008

Related U.S. Application Data

(60) Provisional application No. 60/829,136, filed on Oct. 11, 2006, provisional application No. 60/829,135, filed on Oct. 11, 2006, provisional application No. 60/829,132, filed on Oct. 11, 2006, provisional application No. 60/886,193, filed on Jan. 23, 2007, provisional application No. 60/887,580, filed on Jan. 31, 2007.

(51) Int. Cl.
*G06F 17/00* (2006.01)
(52) U.S. Cl.
USPC ............................ 707/722; 707/713; 707/721
(58) Field of Classification Search .................. 707/721, 707/722, 713
See application file for complete search history.

(56) References Cited

U.S. PATENT DOCUMENTS

| | | | |
|---|---|---|---|
| 4,823,306 A | 4/1989 | Barbic et al. | |
| 5,146,816 A | 9/1992 | Badstieber et al. | |
| 5,301,109 A | 4/1994 | Landauer et al. | |
| 5,325,445 A | 6/1994 | Herbert | |
| 5,619,709 A | 4/1997 | Caid et al. | |
| 5,825,943 A | 10/1998 | DeVito et al. | |
| 5,857,179 A | 1/1999 | Vaithyanathan et al. | |
| 5,864,845 A | 1/1999 | Voorhees et al. | |
| 5,926,812 A | 7/1999 | Hilsenrath et al. | |
| 5,963,724 A | 10/1999 | Mantooth et al. | 703/14 |
| 5,964,724 A | 10/1999 | Rivera et al. | |
| 5,987,457 A | 11/1999 | Ballard | |
| 6,006,225 A | 12/1999 | Bowman et al. | |
| 6,098,065 A | 8/2000 | Skillen et al. | |

(Continued)

FOREIGN PATENT DOCUMENTS

| | | |
|---|---|---|
| EP | 1 653 376 | 10/2005 |
| WO | WO-2007124430 | 11/2007 |

OTHER PUBLICATIONS

"Searchable Banners: The Next Wave for Online Databases" (Borrell Associates Inc., Nov. 2005.)

(Continued)

*Primary Examiner* — Mahesh Dwivedi
(74) *Attorney, Agent, or Firm* — Stein IP, LLP

(57) ABSTRACT

A computer-implemented method is provided, including receiving a search query from a user during a search session, and presenting information to the user responsively to the search query. After an indication that the user takes an action related to the search session is received, a portion of the presented information is identified that the user did not select prior to taking the action, and respective scores are assigned to search results generated responsively to the search query, including lowering one or more of the scores of the respective search results that are characterized by the non-selected portion of the presented information. The search results are ranked according to the scores, and presented to the user. Other embodiments are also described.

28 Claims, 14 Drawing Sheets

U.S. PATENT DOCUMENTS

| | | |
|---|---|---|
| 6,137,911 A | 10/2000 | Zhilyaev |
| 6,167,397 A | 12/2000 | Jacobson et al. |
| 6,189,002 B1 | 2/2001 | Roitblat |
| 6,289,535 B1 | 9/2001 | Hernandez |
| 6,321,226 B1 | 11/2001 | Garber et al. |
| 6,347,313 B1 | 2/2002 | Ma et al. |
| 6,363,379 B1 | 3/2002 | Jacobson et al. |
| 6,377,961 B1 | 4/2002 | Ryu |
| 6,411,950 B1 | 6/2002 | Moricz et al. |
| 6,442,545 B1 | 8/2002 | Feldman et al. |
| 6,449,765 B1 | 9/2002 | Ballard |
| 6,513,036 B2 | 1/2003 | Fruensgaard et al. |
| 6,529,903 B2 | 3/2003 | Smith et al. |
| 6,539,377 B1 | 3/2003 | Culliss |
| 6,564,213 B1 * | 5/2003 | Ortega et al. ................... 1/1 |
| 6,581,056 B1 | 6/2003 | Rao |
| 6,611,825 B1 | 8/2003 | Billheimer et al. |
| 6,647,383 B1 | 11/2003 | August et al. ................... 1/1 |
| 6,671,681 B1 | 12/2003 | Emens et al. |
| 6,675,205 B2 | 1/2004 | Meadway et al. |
| 6,701,309 B1 | 3/2004 | Beeferman et al. |
| 6,708,176 B2 | 3/2004 | Strunk et al. |
| 6,711,577 B1 | 3/2004 | Wong et al. |
| 6,732,088 B1 | 5/2004 | Glance et al. |
| 6,772,150 B1 | 8/2004 | Whitman et al. |
| 6,839,682 B1 | 1/2005 | Blume et al. |
| 6,842,906 B1 | 1/2005 | Bowman-Amuah |
| 6,876,997 B1 | 4/2005 | Rorex et al. |
| 6,904,408 B1 | 6/2005 | McCarthy et al. |
| 6,904,588 B2 | 6/2005 | Reddy et al. |
| 6,920,448 B2 | 7/2005 | Kincaid et al. |
| 6,925,460 B2 | 8/2005 | Kummamuru et al. |
| 6,947,930 B2 | 9/2005 | Anick et al. |
| 6,978,263 B2 | 12/2005 | Soulanille |
| 6,983,320 B1 | 1/2006 | Thomas et al. |
| 7,013,323 B1 | 3/2006 | Thomas et al. |
| 7,028,072 B1 | 4/2006 | Kliger et al. |
| 7,065,550 B2 | 6/2006 | Raghunandan |
| 7,076,497 B2 | 7/2006 | Donteverde |
| 7,089,237 B2 | 8/2006 | Turnbull et al. |
| 7,096,218 B2 | 8/2006 | Schirmer et al. |
| 7,110,993 B2 | 9/2006 | Soulanille et al. |
| 7,152,059 B2 | 12/2006 | Monteverde |
| 7,152,061 B2 | 12/2006 | Curtis et al. |
| 7,152,065 B2 | 12/2006 | Behrens et al. |
| 7,181,438 B1 | 2/2007 | Szabo |
| 7,236,969 B1 | 6/2007 | Skillen et al. |
| 7,257,570 B2 | 8/2007 | Riise et al. |
| 7,272,638 B2 | 9/2007 | Lee et al. |
| 7,295,991 B1 | 11/2007 | Clarke et al. |
| 7,296,019 B1 * | 11/2007 | Chandrasekar et al. ............... 1/1 |
| 7,313,556 B2 | 12/2007 | Gallivan et al. |
| 7,319,975 B2 | 1/2008 | Monteverde |
| 7,321,892 B2 | 1/2008 | Vadon et al. |
| 7,376,709 B1 | 5/2008 | Brei et al. |
| 7,451,129 B2 | 11/2008 | Lamping et al. |
| 7,451,130 B2 | 11/2008 | Gupta et al. |
| 7,461,059 B2 | 12/2008 | Richardson et al. |
| 7,464,079 B2 | 12/2008 | Soulanille |
| 7,469,245 B2 | 12/2008 | Skillen et al. |
| 7,499,940 B1 | 3/2009 | Gibbs |
| 7,529,740 B2 | 5/2009 | Chang et al. ................... 1/1 |
| 7,539,693 B2 | 5/2009 | Frank et al. |
| 7,562,074 B2 | 7/2009 | Liddell et al. |
| 7,565,345 B2 | 7/2009 | Bailey et al. |
| 7,567,958 B1 | 7/2009 | Alspector et al. |
| 7,577,718 B2 | 8/2009 | Slawson et al. |
| 7,593,929 B2 | 9/2009 | Dettinger et al. |
| 7,596,581 B2 | 9/2009 | Frank et al. |
| 7,606,798 B2 | 10/2009 | Ge et al. |
| 7,634,462 B2 | 12/2009 | Weyand et al. |
| 7,636,714 B1 | 12/2009 | Lamping et al. |
| 7,660,737 B1 | 2/2010 | Lim et al. |
| 7,660,815 B1 | 2/2010 | Scofield et al. |
| 7,676,462 B2 | 3/2010 | Kirkland et al. |
| 7,676,517 B2 | 3/2010 | Hurst-Hiller et al. |
| 7,685,192 B1 | 3/2010 | Scofield et al. |
| 7,739,357 B2 | 6/2010 | Gould |
| 7,752,326 B2 | 7/2010 | Smit |
| 7,756,855 B2 | 7/2010 | Ismalon |
| 7,774,335 B1 | 8/2010 | Scofield et al. |
| 7,774,339 B2 | 8/2010 | White et al. |
| 7,774,348 B2 | 8/2010 | Delli Santi et al. |
| 7,788,252 B2 | 8/2010 | Delli Santi et al. |
| 7,788,276 B2 | 8/2010 | Peng et al. |
| 7,792,813 B2 | 9/2010 | Selberg |
| 7,792,832 B2 | 9/2010 | Poltorak |
| 7,793,326 B2 | 9/2010 | McCoskey et al. |
| 7,797,421 B1 | 9/2010 | Scofield et al. |
| 7,805,339 B2 | 9/2010 | Ashkenazi et al. |
| 7,805,450 B2 | 9/2010 | Delli Santi et al. |
| 7,809,721 B2 | 10/2010 | Putivsky et al. |
| 7,810,119 B2 | 10/2010 | Johnson |
| 7,813,967 B2 | 10/2010 | Kopelman et al. |
| 7,814,097 B2 | 10/2010 | Smith et al. |
| 7,822,774 B2 | 10/2010 | Craswell et al. |
| 7,831,582 B1 | 11/2010 | Scofield et al. |
| 7,870,147 B2 | 1/2011 | Bailey et al. |
| 7,962,479 B2 | 6/2011 | Jones et al. |
| 8,073,868 B2 | 12/2011 | Lavi |
| 8,135,729 B2 | 3/2012 | Brewer et al. |
| 2002/0073088 A1 | 6/2002 | Beckmann et al. |
| 2002/0078045 A1 | 6/2002 | Dutta |
| 2002/0100040 A1 | 7/2002 | Bull |
| 2002/0107853 A1 | 8/2002 | Hofmann et al. |
| 2002/0111994 A1 | 8/2002 | Raghunandan |
| 2002/0133483 A1 | 9/2002 | Klenk et al. |
| 2002/0161747 A1 | 10/2002 | Li et al. |
| 2002/0169764 A1 | 11/2002 | Kincaid et al. |
| 2002/0198882 A1 | 12/2002 | Linden et al. |
| 2003/0058277 A1 | 3/2003 | Bowman-Amuah |
| 2003/0061206 A1 | 3/2003 | Qian |
| 2003/0123443 A1 | 7/2003 | Anwar |
| 2003/0140313 A1 | 7/2003 | Smith |
| 2003/0220917 A1 | 11/2003 | Copperman et al. |
| 2004/0010566 A1 | 1/2004 | Monteverde |
| 2004/0034799 A1 | 2/2004 | Mikami |
| 2004/0068486 A1 * | 4/2004 | Chidlovskii ................... 707/3 |
| 2004/0153472 A1 | 8/2004 | Rieffanaugh |
| 2004/0158559 A1 | 8/2004 | Poltorak |
| 2004/0249809 A1 | 12/2004 | Ramani et al. |
| 2005/0027691 A1 | 2/2005 | Brin et al. |
| 2005/0033657 A1 | 2/2005 | Herrington et al. |
| 2005/0055341 A1 | 3/2005 | Haahr et al. |
| 2005/0076003 A1 | 4/2005 | DuBose et al. |
| 2005/0076097 A1 | 4/2005 | Sullivan et al. |
| 2005/0086283 A1 | 4/2005 | Marshall |
| 2005/0091204 A1 | 4/2005 | Melman |
| 2005/0108001 A1 | 5/2005 | Aarskog |
| 2005/0114322 A1 | 5/2005 | Melman |
| 2005/0114324 A1 | 5/2005 | Mayer |
| 2005/0131762 A1 | 6/2005 | Bharat et al. |
| 2005/0144158 A1 * | 6/2005 | Capper et al. ................... 707/3 |
| 2005/0149494 A1 | 7/2005 | Lindh et al. |
| 2005/0171760 A1 | 8/2005 | Tinkler ................... 704/10 |
| 2005/0210024 A1 * | 9/2005 | Hurst-Hiller et al. ............... 707/5 |
| 2005/0216434 A1 * | 9/2005 | Haveliwala et al. ............... 707/1 |
| 2005/0222989 A1 | 10/2005 | Haveliwala et al. |
| 2005/0234881 A1 | 10/2005 | Burago et al. |
| 2005/0234904 A1 * | 10/2005 | Brill et al. ................... 707/5 |
| 2005/0283468 A1 * | 12/2005 | Kamvar et al. ................... 707/3 |
| 2006/0026013 A1 * | 2/2006 | Kraft ................... 705/1 |
| 2006/0047643 A1 | 3/2006 | Chaman |
| 2006/0059134 A1 | 3/2006 | Palmon et al. |
| 2006/0074883 A1 | 4/2006 | Teevan et al. |
| 2006/0101074 A1 * | 5/2006 | Cancilla et al. ............ 707/104.1 |
| 2006/0115145 A1 | 6/2006 | Bishop et al. |
| 2006/0161520 A1 | 7/2006 | Brewer et al. |
| 2006/0161553 A1 | 7/2006 | Woo |
| 2006/0167842 A1 | 7/2006 | Watson |
| 2006/0179051 A1 | 8/2006 | Whitney et al. |
| 2006/0184512 A1 | 8/2006 | Kohanim et al. |
| 2006/0218146 A1 | 9/2006 | Bitan et al. |
| 2006/0253427 A1 | 11/2006 | Wu et al. |
| 2006/0259481 A1 | 11/2006 | Handley |
| 2006/0282328 A1 | 12/2006 | Gerace et al. |
| 2006/0294084 A1 | 12/2006 | Patel et al. |

| | | | |
|---|---|---|---|
| 2007/0005590 | A1* | 1/2007 | Thrasher ............................ 707/5 |
| 2007/0011154 | A1 | 1/2007 | Musgrone et al. |
| 2007/0011668 | A1 | 1/2007 | Wholey et al. |
| 2007/0043617 | A1 | 2/2007 | Stein et al. |
| 2007/0043688 | A1 | 2/2007 | Kountz et al. |
| 2007/0050339 | A1 | 3/2007 | Kasperski et al. |
| 2007/0061301 | A1 | 3/2007 | Ramer et al. |
| 2007/0073756 | A1 | 3/2007 | Manhas et al. |
| 2007/0083506 | A1 | 4/2007 | Liddell et al. |
| 2007/0121843 | A1 | 5/2007 | Atazky et al. |
| 2007/0162396 | A1 | 7/2007 | Goldman et al. |
| 2007/0162422 | A1 | 7/2007 | Djabarov |
| 2007/0174255 | A1 | 7/2007 | Sravanapudi et al. |
| 2007/0198474 | A1* | 8/2007 | Davidson et al. ................. 707/3 |
| 2007/0198506 | A1 | 8/2007 | Attaran Rezaei et al. |
| 2007/0198526 | A1 | 8/2007 | Pitkow |
| 2007/0203929 | A1 | 8/2007 | Bolivar |
| 2007/0214123 | A1 | 9/2007 | Messer et al. |
| 2007/0244866 | A1 | 10/2007 | Mishkanian et al. |
| 2007/0250500 | A1 | 10/2007 | Ismalon |
| 2007/0250511 | A1 | 10/2007 | Endler et al. |
| 2007/0255702 | A1* | 11/2007 | Orme ................................ 707/5 |
| 2007/0266019 | A1 | 11/2007 | Lavi |
| 2007/0276829 | A1* | 11/2007 | Wang et al. ........................ 707/7 |
| 2008/0004959 | A1 | 1/2008 | Tunguz-Zawislak et al. |
| 2008/0016034 | A1* | 1/2008 | Guha et al. ........................ 707/3 |
| 2008/0065617 | A1* | 3/2008 | Burke et al. ...................... 707/5 |
| 2008/0070209 | A1 | 3/2008 | Zhuang et al. |
| 2008/0091670 | A1 | 4/2008 | Ismalon |
| 2008/0114751 | A1* | 5/2008 | Cramer et al. ..................... 707/5 |
| 2008/0137668 | A1 | 6/2008 | Rodriguez et al. |
| 2008/0140643 | A1 | 6/2008 | Ismalon |
| 2008/0172363 | A1 | 7/2008 | Wang et al. |
| 2008/0172380 | A1 | 7/2008 | Czyz et al. |
| 2008/0215416 | A1 | 9/2008 | Ismalon |
| 2008/0275861 | A1 | 11/2008 | Baluja et al. |
| 2008/0288596 | A1 | 11/2008 | Smith et al. |
| 2008/0300937 | A1 | 12/2008 | Allen et al. |
| 2009/0119261 | A1 | 5/2009 | Ismalon |
| 2009/0144234 | A1 | 6/2009 | Sharif et al. |
| 2009/0228296 | A1 | 9/2009 | Ismalon |
| 2009/0241065 | A1 | 9/2009 | Costello |
| 2009/0241066 | A1 | 9/2009 | Costello |
| 2010/0228710 | A1 | 9/2010 | Imig et al. |

OTHER PUBLICATIONS

David Berkowitz, "Banner Ads: The New Search Engine", SearchINSIDER ( Dec. 6, 2005).
http://developers.evrsoft.com/forum/showthread.php?t=2039, Oct. 2003.
An English Abstract of CN 1967534 dated Nov. 6, 2006.
Guy Shani, et al., Establishing User Profiles in MediaScout recommender system, 2007 (Affinity), May 2007.
Pamela Parker, ClickZ, Interactive Ads play Big Role in "Miniority Report" Jun. 12, 2002 (InteractiveAd).
Internet Archives, www.waybackmachine-www.cnn.com (CNN2005), Oct. 2005.
An Office Action dated Nov. 10, 2010, which issued during the prosecution of Applicant's U.S. Appl. No. 12/023,564.
Beeferman and Berger Agglomerative clustering of a search engine query log , pp. 407-416, 2000.
Sahami and Heilman A web based kernel function for matching short text snippets, pp. 2-9, 2005.
Li et al. A new approach to query expansion, pp. 2302-2306, Aug. 2005.
Sunayama et al. Refining search expression by discovering hidden users interests, pp. 186-197, 1998.
Stenmark to search is great, Oct. 1997.
U.S. Appl. No. 11/633,461, filed Dec. 5, 2006, Emil lsmalon.
Chandalia, G. et al., "Re-ranking Search Results based on Perturbation of Concept-Association Graphs" Apr. 2006.
Dalmau, M. et al., "Integrating thesaurus relationships into search and browse in an online photograph collection", Library Hi Tech, vol. 23, No. 3, Aug. 13, 2004, pp. 425-452.
Jan Pedersen et al., Snippet Search: a Single Phrase Approach to Text Access (1991) (Xerox Parc) In Proceedings of the 1991 Joint Statistical Meetings. American Statistical Association.

Guy Shani, et al., Establishing User Profiles in MediaScout recommender system, Mar. 2007 (Affinity).
Internet Archives, www.waybackmachine-www.cnn.com (CNN Oct. 2005).
U.S. Office Action dated Mar. 5, 2012, which issued during the prosecution of corresponding U.S. Appl. No. 12/253,087.
U.S. Office Action dated Dec. 1, 2011, which issued during the prosection of corresponding U.S. Appl. No. 12/397,510.
U.S. Office Action dated Mar. 16, 2012, which issued during the prosecution of corresponding U.S. Appl. No. 12/491,451.
An Office Action dated Jul. 31, 2012, which issued during the prosecution of U.S. Appl. No. 12/491,451.
Chen Ming Chang, Mining progressive user behavior for E-commerce, A Thesis present to the Faculty of the Graduate School of the University of Missouri-Columbia. Dec. 2007.
An Office Action dated Aug. 23, 2012 which issued during the prosecution of U.S. Appl. No. 12/801,534.
Office Action dated Dec. 28, 2012, issued in corresponding U.S. Appl. No. 12/397,510.
Anick P, "Interactive Document Retrieval using Faceted Terminological Feeback," HICSS 2:2036 (1999).
Gauch S et al. "An Expert System for Automatic Query Reformulation" (1993).
Guach S et al., "A Corpus Analysis Approach for Automatic Query Expansion and Its Extension to Multiple Databases," ACM Transactions on Information System, vol. 17, No. 3, pp. 250-269 (Jul. 1999).
Hoeber O et al., "Visualization Support for Interactive Query Refinement," Department of Computer Science, University of Regina, Regina, Saskatchewan, Canada (Sep. 2005).
Koutrika G, "A Unified User Profile Framework for Query Disambiguation and Personalization," PIA 2005: 44-53 (July. 24-25, 2005).
Mena E et al., "Observer: An Approach for Query Processing in Global Information Systems Based on Interoperation Across Pre-Existing Ontologies," Distributed and Parallel Databases, 8, 233-271 (Apr. 2000).
Smyth B et al., "Exploiting Query Repetition and Regularity in an Adaptive Community-Based Wed Search Engine," User Modeling and User-Adapted Interaction 14:383-423 (2004).
An Office Action dated Mar. 31, 2011 which issued during the prosecution of U.S. Appl. No. 12/397,510.
An Office Action dated Jul. 11, 2011 which issued during the prosecution of U.S. Appl. No. 12/023,564.
An Office Action dated Jul. 18, 2011 which issued during the prosecution of U.S. Appl. No. 12/491,451.
Bakshi and Karger Semantic web applications, 2005.
Jansenand McNeese Evaluating the effectiveness of and patterns of interactions pp. 1480-1503, 2005.
Beeferman and Berger Agglomerative clustering of a search engine query log, pp. 407-416, 2000.
Storey et al. The role of user profiles in context aware query processing, pp. 51-63, 2004.
Ye et al. Towards lightweight application integration based on mashup, 2009 Congress on Services—I.
Birman et al. Building collaboration applications, 2009 IEEE International Conference on Web services.
Sahami and Heilman A web based kernal function for matching short text snippets, pp. 2-9, 2005.
Fluit Autofocus semantic search for the desktop, 2005 IEEE.
Lie et al. A new approach to query expansion, pp. 2302-2306, Aug. 2005.
Woolston, Pro Ajax and the NET 2 0 Platform, 2006.
Sugiyama et al. Adaptive Web Search Based on User Profile Constructed Without Any Effort from Users, 2004.
Valentine, Google Suggest Tool Beta-Amazing, Dec. 2004.
Gretzel and Wober, Intelligent search support ISBN 3-211-20669-8, 2004.
Joshi and Motwani Keyword generation for search engine advertising, ISBN 0-7695-2702-7 pp. 490-496, 2006.
Lu et al. Extending a Web Browser with Client-Side Mining, pp. 166-177, 2003.
Oliveira et al. Interactive Query Expansion in a Meta-search Engine, pp. 50-57, 1999.

Smeaton Relevance Feedback and Query Expansion for Searching the Web A Model for Searching a Digital Library, ISBN 3-540-63554-8, Sep. 1997.

Sunayama et al. Refining search expression by discovering hidden user interests, pp. 186-197, 1998.

Anick, Using terminological feedback for websearch, pp. 88-95, 2003.

Chen et al. Internet browsing and searching, pp. 582-603, 1998.

Dzeng and Chang Learning search keywords for search procurement, 2004.

Huang et al. Relevant term suggestion, pp. 638-649, 2003.

Jones et al. Generating query substitutions, 2006.

Lovic et al. Enhancing search engine performance using expert systems, 2006 IEEE.

Scholer and Williams Query association for effective retrieval, pp. 324-331, 2002.

Steinmark To search is great, Oct. 1997.

Cooper and Byrd Obiwan A Visual Interface for Prompted Query Refinement, 1998 IEEE.

Glance Community Search Assistant, pp. 91-96, 2001.

An Office Action dated Jun. 13, 2011 which issued during the prosecution of U.S. Appl. No. 12/253,087.

U.S. Appl. No. 60/887,580, filed Jan. 31, 2007, Levy Cohen.

U.S. Appl. No. 60/829,136, filed Oct. 11, 2006, Emil Ismalon.

U.S. Appl. No. 60/829,135, filed Oct. 11, 2006, Emil Ismalon.

U.S. Appl. No. 60/829,132, filed Oct. 11, 2006, Emil Ismalon.

U.S. Appl. No. 60/886,193, filed Jan. 23, 2007, Emil Ismalon.

U.S. Appl. No. 60/796,188, filed May 1, 2006, Emil Ismalon.

U.S. Appl. No. 60/793,253, filed Apr. 20, 2006, Emil Ismalon.

U.S. Appl. No. 60/741,902, filed Dec. 5, 2005, Emil Ismalon.

U.S. Appl. No. 11/633,461, filed Dec. 5, 2006, Emil Ismalon.

\* cited by examiner

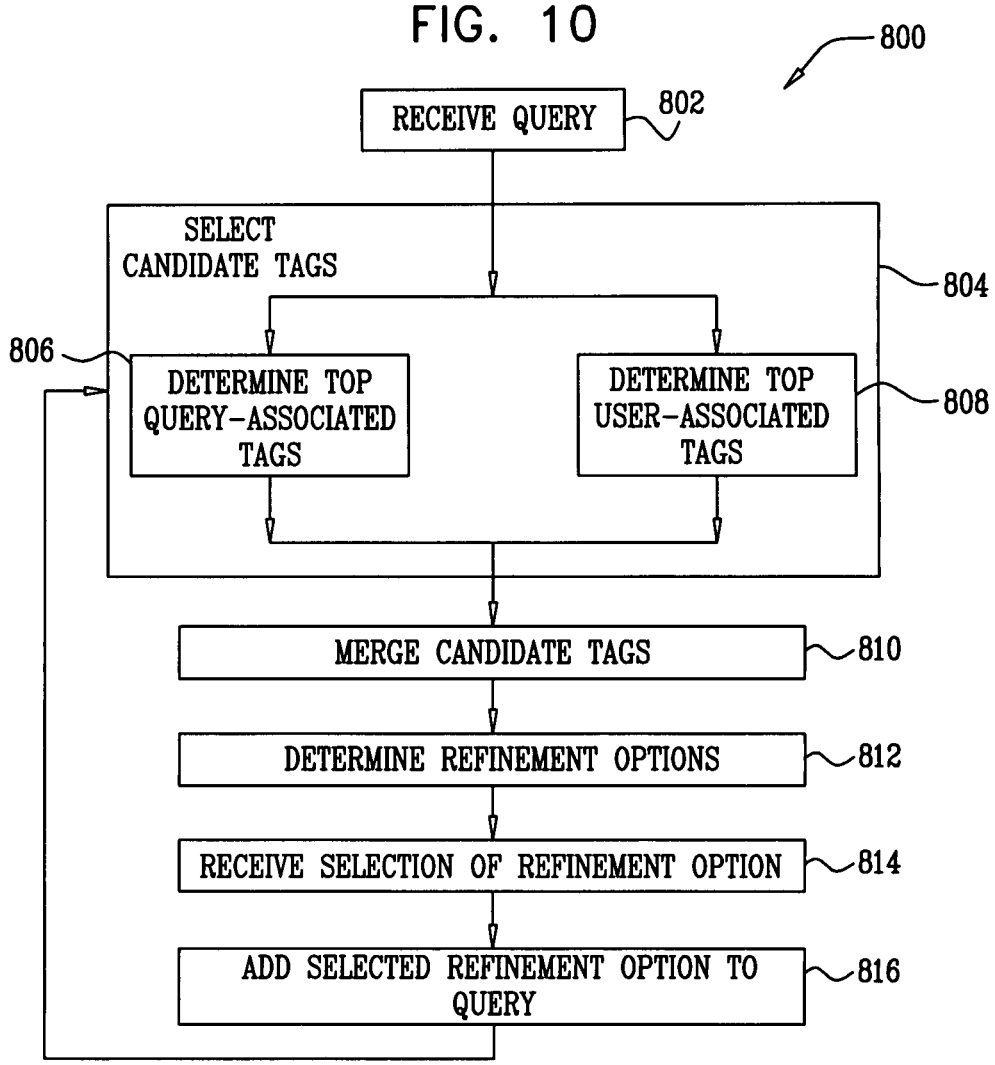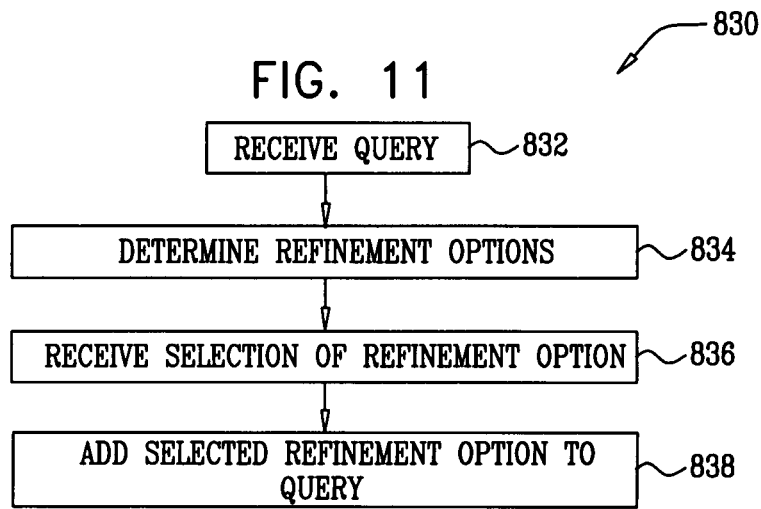

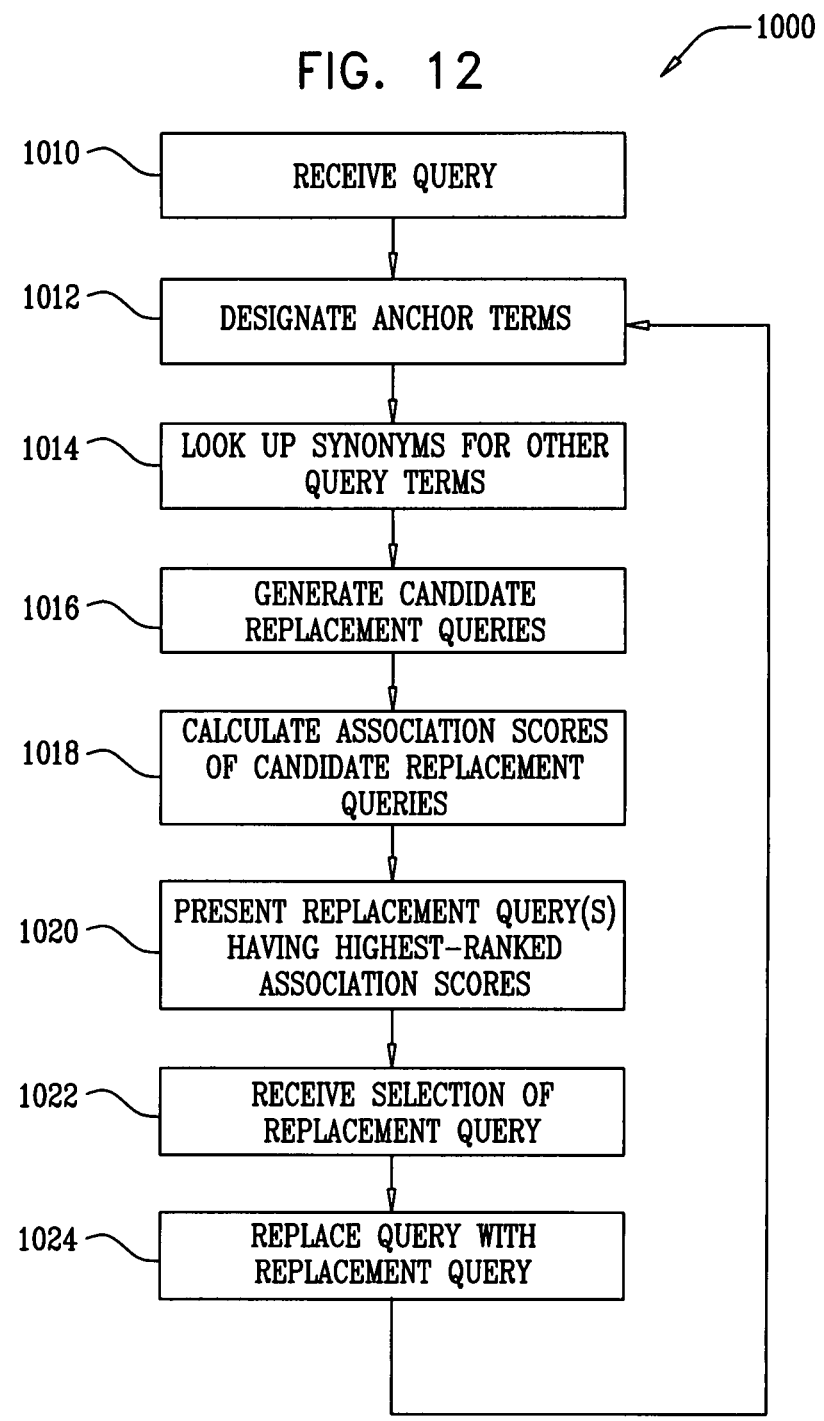

Spin (physics) - MSN Encarta
Spin (physics), in physics, intrinsic angular momentum of a
sub-atomic particle. ... physics, there are two types of angular
momentum: spin and orbital angular ...
http://encarta.msn.com/encyclopedia_761578284/Spin_(physics).html SparkNotes: SAT Physics: Angular Momentum
... to deal only with the angular momentum of a particle or ... It is
likely that angular momentum will be tested in a conceptual
manner on SAT II Physics. ...
http://www.sparknotes.com/testprep/books/sat2/physics/chapter10section6.rhtml Spin
Spin, in physics is the intrinsic angular momentum of a sub-atomic
particle. ... physics, there are two types of angular momentum: spin
and orbital angular ...
http://www.cartage.org.lb/en/themes/Sciences/Physics/Atomicphysics/spin/spin.html Spin (physics) - Wikipedia, the free encyclopedia
In physics and chemistry, spin is the angular momentum intrinsic
to a body, as opposed to orbital angular momentum, which is the
motion of its center of mass ...
http://en.wikipedia.org/wiki/Spin_(physics)

Electron spin
... to two possibilities for the z-component of the angular
momentum. ... HyperPhysics* Quantum Physics. R Nave. Go Back.
Electron Intrinsic Angular Momentum ...
http://hyperphysics.phy-astr.gsu.edu/hbase/spin.html Yahoo! Answers - Physics angular acceleration problem?
when the music starts, the CD is rotating at an angular speed of
480 revolutions per minute. ... Physics angular acceleration problem?
a CD has a playing time ...
http://malaysia.answers.yahoo.com/question/index?qid=20070625183102AA01JbB Angular momentum - Wikipedia, the free encyclopedia
In physics, the angular momentum of an object rotating about some
reference ... Angular momentum is an important concept in both
physics and engineering, with ...
http://en.wikipedia.org/wiki/Angular_momentum

FIG. 15B

—1110

YouTube - Fun with Physics - Angular Momentum
physics students get an up close and personal experience with
angular momentum on a playground ... angular momentum physics
wreck playground (more) (less) URL ...
http://www.youtube.com/watch?v=us6CCWJPp3c Angular Momentum -- from Eric Weisstein's World of Physics
Angular Momentum. For a single particle, the angular momentum
vector is defined by ... Angular Momentum Commutators, Angular
Momentum Operators, Moment of Inertia ...
http://scienceworld.wolfram.com/physics/AngularMomentum.html What is the answer to this physics angular speed problem? - Yahoo! Answers ... through 11.88 revolutions in 4.2 seconds before reaching its final
angular speed. ... What is the answer to this physics angular speed
problem? Here it is (I'm stuck! ...
http://answers.yahoo.com/question/index?qid=20070928204200AAUWUUx

FIG. 16A  ⟵1102

Amazon.com: Angular Momentum in Quantum Mechanics
(Investigations in Physics): Books: A. R. Edmonds
Amazon.com: Angular Momentum in Quantum Mechanics
(Investigations in Physics): Books: A. R. Edmonds by A. R. Edmonds
... Angular Momentum: Understanding ...
http://www.amazon.com/Angular-Momentum-Quantum-Mechanics-Investigations/dp/0691025894

Physics Lecture 16 - Angular Momentum
The quantity L is therefore referred to as the angular momentum.
... to the textbooks in calculus and physics, the cross-product
represents the area ...
http://dept.physics.upenn.edu/courses/gladney/phys150/lectures/lecture_nov_17_1999.html Amazon.com: Angular Momentum in Quantum Mechanics
(Investigations in Physics, No 4): Books: A. R. Edmonds
Amazon.com: Angular Momentum in Quantum Mechanics
(Investigations in Physics, No 4): Books: A. R. ... Angular Momentum:
Understanding Spatial Aspects in ...
http://www.amazon.com/Angular-Momentum-Quantum-Mechanics-Investigations/dp/0691079129

Angular uncertainty passes test - Physics World - physicsworld.com
Physics in Action. Oct 6, 2004. Angular uncertainty passes test ... a
concept or idea from modern physics, the most popular answer
would probably be ...
http://physicsworld.com/cws/article/print/20408 angular momentum -- Britannica Online Encyclopedia
... online encyclopedia article on angular momentum: property
characterizing the ... In terms of classical physics, angular
momentum is a property of a body that is ...
http://www.britannica.com/eb/article-9007612/angular-momentum

HyperPhysics
... exploration environment for concepts in physics which employs
concept maps and ... conservation of angular momentum
*conservation of energy *conservation ...
http://hyperphysics.phy-astr.gsu.edu/hbase/hframe.html A POINT OF PHYSICS
lar momentum," the sum of the particles' angular momentum rela
... [2] See "Elegant Connections in Physics: Angular Momentum and
Spin, ...
http://www.spsobserver.org/articles/point_of_physics_03.pdf Graduate Physics Laboratory Handbook: Angular Coorelations
This is one of the original gamma-gamma angular correlations
experiments. ... for Nuclear and Particle Physics Experiments, New
York: Springer Verlag (1996) ...
http://www.physics.umd.edu/courses/Phys621/gradlab/glhb/angular.html Problem Set - Angular Motion - Physics 107
Phyllis Fleming Physics. Physics 107. Review - Angular Motion. 1. ...
?? moved by a particle rotating with a constant angular velocity ??
in time t. ...
http://www.wellesley.edu/Physics/phyllisflemingphysics/n107_p_angular.html Orbital Angular Momentum -- from Eric Weisstein's World of Physics
The magnitude of the orbital angular momentum is characterized by
the azimuthal ... R. and Resnick, R. Quantum Physics of Atoms,
Molecules, Solids, Nuclei, ...
http://scienceworld.wolfram.com/physics/OrbitalAngularMomentum.html

NEGATIVE ASSOCIATIONS FOR SEARCH RESULTS RANKING AND REFINEMENT

CROSS-REFERENCES TO RELATED APPLICATIONS

The present patent application claims priority from the following provisional patent applications, all of which are assigned to the assignee of the present application and are incorporated herein by reference:

U.S. Provisional Patent Application 60/829,136, filed Oct. 11, 2006, entitled, "Apparatus and methods thereof for search phrase refinement";

U.S. Provisional Patent Application 60/829,135, filed Oct. 11, 2006, entitled, "Apparatus and methods thereof for using explicit query refinements to tune search results ranking factors";

U.S. Provisional Patent Application 60/829,132, filed Oct. 11, 2006, entitled, "Apparatus and methods thereof for adaptive ranking mechanism using association graphs and contextual analysis";

U.S. Provisional Patent Application 60/886,193, filed Jan. 23, 2007, entitled, "Multi-directional and auto-adaptive relevance and search system and methods thereof"; and U.S. Provisional Patent Application 60/887,580, filed Jan. 31, 2007, entitled, "Searchable banner display and apparatus that enables exploring destination content prior to reaching it."

FIELD OF THE INVENTION

The present invention relates generally to improving results returned by search engines, and specifically to techniques for ranking search results and generating search refinement options.

BACKGROUND OF THE INVENTION

Internet search engines have become fundamental tools for nearly all users seeking information and sites on the World Wide Web (WWW). Users can find vast amounts of data and select the data that appears to best match specific search criteria. Free-text searches are generally performed by providing a search phrase including one or more keywords, and optionally Boolean operators. The most widely used free-text search engines currently are provided by Google, Inc. and Yahoo, Inc.

Based on the search phrase provided by a user, a search engine generally returns a list of documents from which the user selects those that appear most relevant. The list typically includes a snippet from each of documents that includes one or more of the keywords, and the URL of the document. Typically, the search engine presents the list of documents in descending order according to general, static criteria established by the search engine provider. Numerous techniques have been developed for ranking the list in order to provide the results most likely to be relevant to a typical user. Some of these techniques take into account the order of the keywords provided by the user.

Such static ranking systems often present high-ranking results that do not match the interests or skills of the searcher, or that do not provide results that correctly reflect the intended meaning of keywords having more than one meaning. For example, a software engineer looking for Java (i.e., software) and a traveler looking for Java (i.e., the island) receive the same results for a query that includes the same keywords, even though their searches had different intended meanings.

In an attempt to increase the relevancy of search results, some search engines suggest search refinement options based on the search keywords entered by the searcher. These search engines typically analyze previous searches conducted by other users, in order to identify refinement options that are related to the keywords entered by the searcher. The searcher is able to narrow his search to better express his search intent by selecting one or more of the refinement options. For example, Google Suggest, provided by Google, Inc., displays a drop-down list of additional related search phrases, as the searcher enters a search query in a search text box. The Clusty search engine, provided by Vivisimo, Inc. groups similar results together into clusters. Some search engines, such as Google, upon detecting potential misspelling of search keywords, present a replacement search query including replacement keywords spelled correctly.

U.S. Pat. No. 5,987,457 to Ballard, which is incorporated herein by reference, describes a method in which a user views search results and subjectively determines if a document is desirable or undesirable. Only documents categorized by the user are analyzed for deriving a list of prospective keywords. The frequency of occurrence of each word of each document is derived. Keywords that occur only in desirable documents are good keywords. Keywords that occur only in undesirable documents are bad keywords. Keywords that occurs in both types are dirty keywords. The best keywords are the good keywords with the highest frequency of occurrence. The worst keywords are the bad keywords with the highest frequency of occurrence. A new query phrase includes the highest ranked good keywords and performs filtering using the highest ranked bad keywords. Key phrases are derived to clean dirty keywords into good key phrases. A key phrase also is derived from a good keyword and replaces the good keyword to narrow a search.

US Patent Application Publication 2005/0076003 to DuBose et al., which is incorporated herein by reference, describes a process for sorting results returned in response to a search query according to learned associations between one or more prior search query search terms and selected results of said prior search queries.

U.S. Pat. No. 6,732,088 to Glance, which is incorporated herein by reference, describes techniques for facilitating searching a data collection, such as the WWW, that take advantage of the collective ability of all users to create queries to the data collection. First, a node-link graph of all queries submitted to a data collection within a given period of time is constructed. In the case of the WWW, the queries would be to a particular search engine. In the graph, each node is a query. There is a link made between two nodes whenever the two queries are judged to be related. A first key idea is that the determination of relatedness depends on the documents returned by the queries, not on the actual terms in the queries themselves. For example, a criterion for relatedness could be that of the top ten documents returned for each query, the two lists have at least one document in common. A second key idea is that the construction of the query graph transforms single user usage of the data collection (e.g., search) into collaborative usage. As a result, all users can tap into the knowledge base of queries submitted by others, because each of the related queries represents the knowledge of the user who submitted the query.

U.S. Pat. No. 6,772,150 to Whitman et al., which is incorporated herein by reference, describes a search engine system that uses information about historical query submissions to a search engine to suggest previously-submitted, related search phrases to users. The related search phrases are preferably suggested based on a most recent set of query submission data (e.g., the last two weeks of submissions), and thus strongly reflect the current searching patterns or interests of users.

US Patent Application Publication 2003/0123443 to Anwar, which is incorporated herein by reference, describes a search engine that utilizes both record based data and user activity data to develop, update, and refine ranking protocols, and to identify words and phrases that give rise to search ambiguity so that the engine can interact with the user to better respond to user queries and enhance data acquisition from databases, intranets, and internets.

The following patents, patent application publications, and other publications, all of which are incorporated herein by reference, may be of interest:

U.S. Pat. No. 6,636,848 to Aridor et al.
U.S. Pat. No. 4,823,306 to Barbic et al.
U.S. Pat. No. 6,513,036 to Fruensgaard et al.
US Patent Application Publication 2002/0133483 to Klenk et al.
U.S. Pat. No. 5,926,812 to Hilsenrath et al.
U.S. Pat. No. 6,289,353 to Hazlehurst et al.
US Patent Application Publication 2005/0055341 to Haahr et al.
U.S. Pat. No. 6,363,379 to Jacobson et al.
U.S. Pat. No. 6,347,313 to Ma et al.
U.S. Pat. No. 6,321,226 to Garber et al.
U.S. Pat. No. 6,189,002 to Roitblat
U.S. Pat. No. 6,167,397 to Jacobson et al.
U.S. Pat. No. 5,864,845 to Voorhees et al.
U.S. Pat. No. 5,825,943 to DeVito et al.
US Patent Application Publication 2005/0144158 to Capper et al.
US Patent Application Publication 2005/0114324 to Mayer
US Patent Application Publication 2005/0055341 to Haahr et al.
U.S. Pat. No. 5,857,179 to Vaithyanathan et al.
U.S. Pat. No. 7,139,755 to Hammond
U.S. Pat. No. 7,152,061 to Curtis et al.
U.S. Pat. No. 6,904,588 to Reddy et al.
U.S. Pat. No. 6,842,906 to Bowman-Amuha
U.S. Pat. No. 6,539,396 to Bowman-Amuha
US Patent Application Publication 2004/0249809 to Ramani et al.
US Patent Application Publication 2003/0058277 to Bowman-Amuha
U.S. Pat. No. 6,925,460 to Kummamuru et al.
U.S. Pat. No. 6,920,448 to Kincaid et al.
US Patent Application Publication 2006/0074883 to Teevan et al.
US Patent Application Publication 2006/0059134 to Palmon et al.
US Patent Application Publication 2006/0047643 to Chaman
US Patent Application Publication 2005/0216434 to Haveliwala et al.
US Patent Application Publication 2003/0061206 to Qian
US Patent Application Publication 2002/0073088 to Beckmann et al.

SUMMARY OF THE INVENTION

In some embodiments of the present invention, a search system is provided that ranks search results based in part on the non-selection of information presented to the user during the search process. Such information typically includes refinement options presented to the user during the search, and/or search results information (e.g., snippets) presented to the user during the search or during previous searches conducted by the user. The system interprets the non-selection of the information as an implicit indication that the user may lack interest in subject matter characterized by the information. When ranking search results, the system lowers the rankings of results more strongly characterized by the non-selected information. The ranking techniques of these embodiments do not utilize explicit feedback from the user regarding the user's level of interest or non-interest in the non-selected information presented to the user. In other words, the user need not actively provide any indication of interest or non-interest in the non-selected information, such as via input elements (e.g., a checkbox, slider, or drop-down menu) associated with respective non-selected items of the non-selected information.

For some applications, the system determines an importance of the non-selection of the information based on the amount of time the user views the non-selected information. The system attributes more importance to non-selected information if the user views the non-selected information for a longer amount of time before taking an action related to the search, such as selecting other, more interesting information.

For some applications in which the presented information includes refinement options, the system additionally attributes greater importance to the non-selection of a refinement option if the user selects another refinement option, rather than selecting no refinement option at all. The system may also take into consideration the position of the non-selected refinement options among the refinement options presented to the user, and the importance of the non-selected information indicated to the search user by the system. For example, the system may indicate the relative importance of refinement options by the font size or color, or by the classification of refinement options into primary and secondary options.

For some applications in which the presented information includes search results, the system considers terms (each of which comprises one or more keywords) appearing in one or more non-selected snippets (both titles and excerpts from the document) that are presented prior to the selected search result. Typically, the importance attributed to the non-selection of a term is positively associated with the frequency of the appearance of the term in the non-selected snippets. For some applications, the system does not attribute importance to the non-selection of a term appearing in prior snippets if the term also appears in the selected snippet.

For some applications, the system uses non-selection information to rank results of subsequent searches conducted by the user during a single search session. Alternatively or additionally, for applications in which the system maintains user profiles over multiple search sessions, the system updates the user profiles to reflect negative associations derived from the non-selection of presented information. Optionally, the system determines refinement options for the user based partially on the derived session-specific information or user profile information.

In some embodiments of the present invention, the system clusters users, search topics, and search result documents in multi-layer association graphs in order to return meaningful, focused results to search queries. The search system utilizes the multi-directional transfer of information from users to documents, in addition to the conventional transfer of information from documents to users, in order to provide search results that are based on personal search characteristics of the user, characteristics of communities to which the user implicitly belongs, and/or characteristics of the global community of users. The search system uses clustering-based techniques to rank search results, and to present search refinement options to the users. The search system performs the clustering based on the search terms used by the users, the search terms used by other users, and the terms in documents to which the users are exposed and select for viewing.

In some embodiments of the present invention, the search system provides personalized search results responsively to associations between search terms and documents returned to a user during previous searches. These associations are represented by a unique personal profile for each user, which typically comprises a personal association graph (PAG). For some applications, the system reflects the information derived from non-selection as negative associations in the PAG.

In some embodiments of the present invention, the search system provides search results responsively to characteristics of communities to which the user implicitly belongs, as determined by the contribution of the user's PAG to topic profiles of these communities, which typically comprise respective topic association groups (TAGs). Each TAG represents the interactions of a plurality of searches conducted by a plurality of users within a single topic.

In the present application, including in the claims, the terms "higher" and "lower," when used with respect to a list of search results, mean closer to and further from the beginning of the list, respectively. Thus, for example, to "lower" the ranking or score of a particular search result means to cause the particular search result to be located further from the beginning of the list of search results.

There is therefore provided, in accordance with an embodiment of the present invention, a computer-implemented method including:

receiving a search query from a user during a search session;

presenting information to the user responsively to the search query; and after receiving an indication that the user takes an action related to the search session:
 identifying a portion of the presented information that the user did not select prior to taking the action,
 assigning respective scores to search results generated responsively to the search query, including lowering one or more of the scores of the respective search results that are characterized by the non-selected portion of the presented information,
ranking the search results according to the scores, and presenting the ranked search results to the user.

Typically, identifying the non-selected portion includes identifying the non-selected portion without receiving explicit feedback from the user regarding a level of interest of the user in the non-selected portion.

Typically, the action is selected from the group consisting of: selecting a portion of the information, submitting the search query, modifying the search query, and requesting additional search results for the search query.

In an embodiment, presenting the information includes presenting refinement options to the user for optional addition to the search query, and identifying the portion includes identifying one or more of the refinement options that the user did not select prior to taking the action. For some applications, the action is selected from the group consisting of: selecting one of the refinement options, submitting the search query, and modifying the search query.

In an embodiment, presenting the information includes receiving a first search query from the user, and presenting first search results generated responsively to the first search query, receiving the search query includes receiving a second search query from the user after receiving the first search query, and ranking the search results includes ranking second search results generated responsively to the second search query.

For some applications, receiving the first search query includes receiving the first search query during the search session. Alternatively, receiving the first search query includes receiving the first search query prior to the search session.

In an embodiment, presenting the information includes presenting a first batch of the search results prior to receiving the indication and prior to ranking the search results according to the scores, the action includes requesting additional search results for the search query, the non-selected information includes all of the search results in the first batch, and presenting the ranked search results includes presenting a second batch of the search results ranked according to the scores.

In an embodiment, identifying the portion of the presented information includes identifying one or more non-selected terms that appear in the non-selected portion, and lowering the scores includes lowering the scores of the respective search results that are associated with the one or more terms. For some applications, the search query includes one or more query terms, and assigning the scores includes: constructing at least one association graph that includes at least a portion of the query terms and the non-selected terms as vertices; and damping a score of an edge of the association graph between two of the vertices respectively representing two of the non-selected terms.

In an embodiment, the search query includes a first search query, the user is a first user, the scores include first scores, and the search results include first search results, and the method includes:

receiving a second search query from a second user after receiving the indication that the first user takes the action;

assigning respective second scores to second search results generated responsively to the second search query, including lowering one or more of the second scores of the respective second search results that are characterized by the portion of the information presented to and not selected by the first user;

ranking the second search results according to the second scores; and presenting the ranked second search results to the second user.

For some applications, the method does not include ranking the first search results by lowering the one or more of the first scores of the respective first search results that are characterized by the portion of the information presented to and not selected by the first user. The non-selection information is nevertheless used for ranking the second search results.

There is further provided, in accordance with an embodiment of the present invention, a computer-implemented method including:

receiving a search query from a user during a search session;

presenting information to the user responsively to the search query; and after receiving an indication that the user takes an action related to the search session:
 identifying a portion of the presented information that the user did not select prior to taking the action,
 generating a set of refinement options for optional addition to the search query, by assigning respective scores to terms that are candidates for inclusion in the set of refinement options, lowering one or more of the scores of the respective candidate terms that are characterized by the non-selected portion of the presented information, and selecting a portion of the candidate terms for inclusion in the set based on the respective scores, and presenting the set of refinement options to the user.

Typically, the action is selected from the group consisting of: selecting a portion of the information, submitting the search query, modifying the search query, and requesting additional search results for the search query.

There is still further provided, in accordance with an embodiment of the present invention, apparatus including:
an interface; and
a processor, which is configured to receive, via the interface, a search query from a user during a search session; present information to the user, via the interface, responsively to the search query; and after receiving, via the interface, an indication that the user takes an action related to the search session, identify a portion of the presented information that the user did not select prior to taking the action, assign respective scores to search results generated responsively to the search query, including lowering one or more of the scores of the respective search results that are characterized by the non-selected portion of the presented information, rank the search results according to the scores, and present the ranked search results to the user, via the interface.

There is additionally provided, in accordance with an embodiment of the present invention, apparatus including:
an interface; and
a processor, which is configured to receive, via the interface, a search query from a user during a search session; presenting information to the user, via the interface, responsively to the search query; and after receiving an indication, via the interface, that the user takes an action related to the search session, identify a portion of the presented information that the user did not select prior to taking the action, generate a set of refinement options for optional addition to the search query, by assigning respective scores to terms that are candidates for inclusion in the set of refinement options, lowering one or more of the scores of the respective candidate terms that are characterized by the non-selected portion of the presented information, and selecting a portion of the candidate terms for inclusion in the set based on the respective scores, and present the set of refinement options to the user, via the interface.

There is yet additionally provided, in accordance with an embodiment of the present invention, a computer software product, including a tangible computer-readable medium in which program instructions are stored, which instructions, when read by a computer, cause the computer to receive a search query from a user during a search session; present information to the user responsively to the search query; and after receiving an indication that the user takes an action related to the search session, identify a portion of the presented information that the user did not select prior to taking the action, assign respective scores to search results generated responsively to the search query, including lowering one or more of the scores of the respective search results that are characterized by the non-selected portion of the presented information, rank the search results according to the scores, and present the ranked search results to the user.

The present invention will be more fully understood from the following detailed description of embodiments thereof, taken together with the drawings, in which:

BRIEF DESCRIPTION OF THE DRAWINGS

FIG. 10 is a flowchart schematically illustrating a method for presenting refinement options pursuant to a community-based preference, in accordance with an embodiment of the present invention;

FIG. 11 is a flowchart schematically illustrating a method for presenting refinement options pursuant to a global-based preference, in accordance with an embodiment of the present invention;

FIG. 12 is a flowchart schematically illustrating a method for presenting refinement options that include search term replacements, in accordance with an embodiment of the present invention;

FIGS. 15A-B and 16A-B show respective exemplary sets of search results, in accordance with respective embodiments of the present invention.

DETAILED DESCRIPTION OF EMBODIMENTS

System Overview

Figure 1:
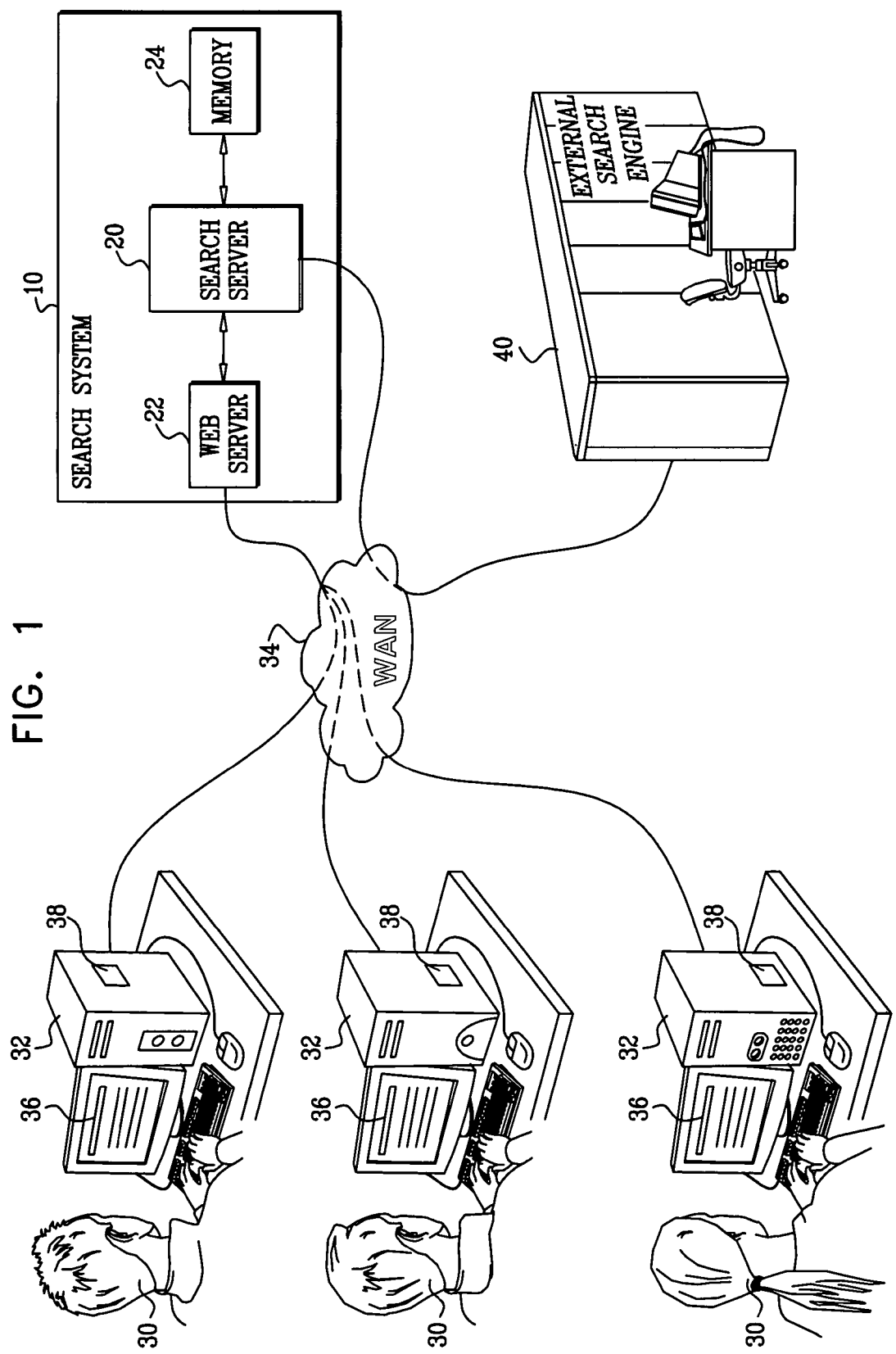
FIG. 1 is a schematic, pictorial illustration of a search system, in accordance with an embodiment of the present invention.

FIG. 1 is a schematic, pictorial illustration of a search system 10, in accordance with an embodiment of the present invention. Search system 10 comprises a search server 20, an interface, such as a web server 22, and a memory 24. Typically, search system 10 comprises one or more standard computer servers with appropriate memory, communication interfaces and software for carrying out the functions prescribed by the present invention. This software may be downloaded to the system in electronic form over a network, for example, or it may alternatively be supplied on tangible media, such as CD-ROM. Memory 24 comprises a non-volatile memory, such as one or more hard disk drives, and/or a volatile memory, such as random-access memory (RAM).

A plurality of users 30 use respective workstations 32, such as a personal computers, to remotely access search system 10 via a wide-area network (WAN) 34, such as the Internet.

Alternatively, one or more of users 30 access search system 10 via a local area network (LAN), or both a LAN and a WAN. Typically, a web browser 36 running on each workstation 32 communicates with web server 22. The web browser facilitates entry and refinement of search queries, and displays search results returned from web server 22. Each of workstations 32 comprises a central processing unit (CPU), system memory, a non-volatile memory such as a hard disk drive, a display, input and output means such as a keyboard and a mouse, and a network interface card (NIC). For some applications, workstation 32 implements an agent 38, typically in software. Agent 38 executes certain processes locally at workstation 32, for example such as described in International Patent Application PCT/US07/67103, filed Apr. 20, 2007, entitled, "Search techniques using association graphs" which is assigned to the assignee of the present application and is incorporated herein by reference, with reference to FIG. 9. Typically, the software of agent 38 is downloaded over WAN 34. Workstations 32 comprises software for carrying out the functions prescribed by the present invention. This software may be downloaded to the system in electronic form over a network, for example, or it may alternatively be supplied on tangible media, such as CD-ROM.

In an embodiment of the present invention, search server 20 utilizes search results obtained from an external search engine 40, as described hereinbelow with reference to FIG. 6. For some applications, external search engine 40 is publicly accessible, such as via the Internet. For other applications, the external search engine is a dedicated search engine that provides searching of a particular website or domain, of resources on a private network, such as an intranet and/or enterprise network, or of a particular computer, such as one of workstations 32. Alternatively, search system 10 comprises a search engine that performs the search functionality of external search engine 40, such as mining and crawling the resources to be searched (configuration not shown).

Figure 2:
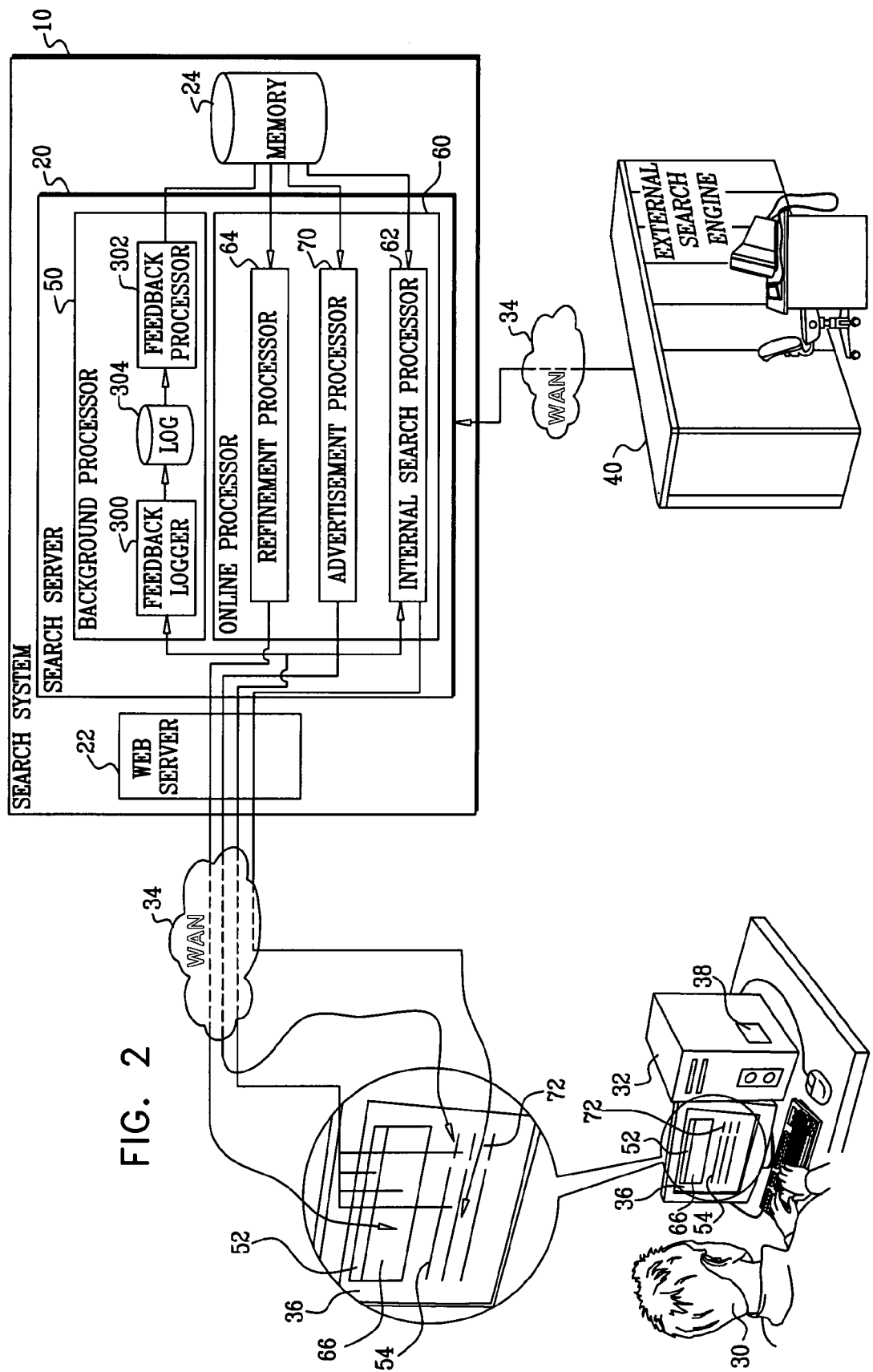
FIG. 2 is a more detailed schematic, pictorial illustration of the search system of FIG. 1, in accordance with an embodiment of the present invention.

Reference is made to FIG. 2, which is a more detailed schematic, pictorial illustration of search system 10, in accordance with an embodiment of the present invention. Search server 20 comprises a background processor 50, which collects and analyzes interactions between users 30 and search system 10, as described in detail hereinbelow with reference to FIGS. 7-13. Such interactions typically include: (a) search queries entered by a user in a search field 52 of browser 36, or populated using the search refinement techniques described hereinbelow with reference to FIGS. 8-20; and (b) clicks on search results 54 by a user.

Search server 20 further comprises an online processor 60, which provides online services to users 30. These services include one or more of:

search services, which are provided by an internal search processor 62 of online processor 60, as described hereinbelow with reference to FIGS. 5-6. Internal search processor 62 typically provides search results via web server 22 as search results 54 in browser 36;

refinement services, which are provided by a refinement processor 64 of online processor 60, as described hereinbelow with reference to FIGS. 8-11. Refinement processor 64 typically provides refinement suggestions via web server 22 as refinement options 66 in browser 36. (In the art, and in the applications assigned to the assignee of the present application that are incorporated hereinbelow by reference, a "refinement option" is sometimes referred to as an "advisory" or as "advisory information."); and advertising services, which are provided by an advertising processor 70 of online processor 60, as described hereinbelow. Advertisement processor 60 typically provides advertisements via web server 22 in an advertisement area 72 in browser 36. Alternatively or additionally, the advertisements are integrated with search results 54, and/or displayed in a popup window, as is known in the art, or using other advertising display techniques known in the art.

Search system 10 generally performs gives higher priority to the processes performed by online processor 60 than to those performed by background processor 50, in order to avoid an interruption of the online services. System 10 typically implements background and online services in a well-balanced parallel and distributed environment, as is known in the art.

Association Graph Overview

Figure 3:
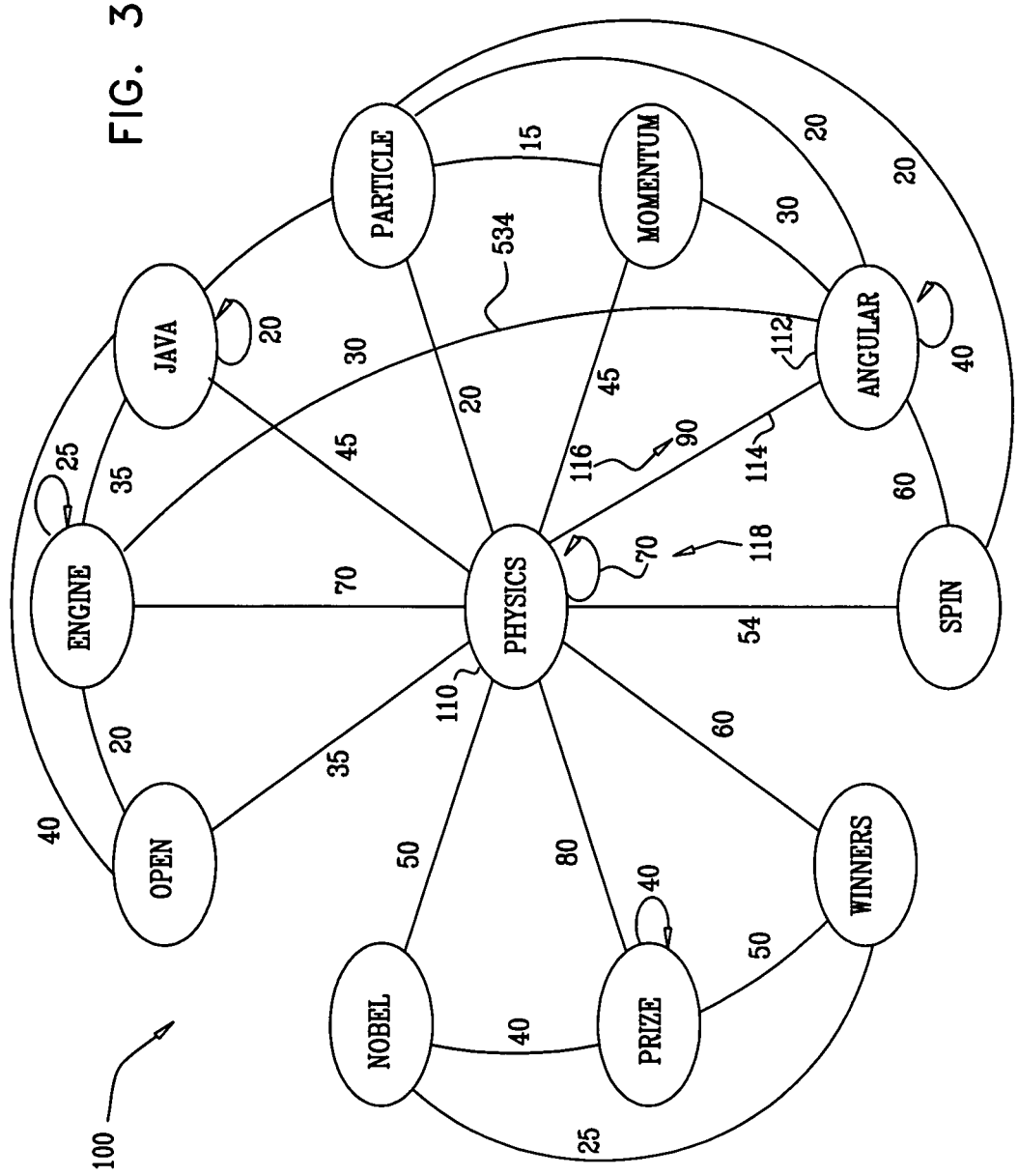
FIG. 3 shows an exemplary association graph, in accordance with an embodiment of the present invention.

Reference is made to FIG. 3, which shows an exemplary association graph 100, in accordance with an embodiment of the present invention. Many of the techniques of embodiments of the present invention utilize association graphs such as illustrated by association graph 100. These association graphs are typically generated and maintained by background processor 50, as described hereinbelow with reference to FIGS. 7-13. Although exemplary association graph 100 includes only limited degrees of association, search system 10 often develops larger and more complex association graphs, which may include degrees of association greater than two.

Search system 10 uses association graphs to cluster users, their search interests and patterns, and information regarding search result documents in respective clusters. Search system 10 creates and maintains one or more of the following association graphs:

a personal association graph (PAG), which is created for each user 30, as described hereinbelow with reference to FIGS. 7-9. In general, each PAG represents the interactions of a plurality documents with a single user during one or more searches conducted during one or more search sessions;

a session association graph (SAG), which is created for each search session for each user 30. In general, each SAG represents the interactions of one or more documents with a single user during one or more searches conducted by the user during a single search session;

a hotspot association graph (generally referred to herein simply as a "hotspot"), one or more of which are extracted from each PAG, as described hereinbelow with reference to FIGS. 10-11. In general, a hotspot includes a portion of a PAG that represents an area of particular importance to the user of the PAG. For some applications, hotspots are alternatively or additionally extracted from each SAG, using the techniques for such extraction from a PAG;

a topic association graph (TAG), which is created for each topic identified by background processor 50, as described hereinbelow with reference to FIGS. 12-13. In general, a TAG represents the interactions of a plurality of searches conducted by a plurality users within a single topic;

a document association graph (DAG), which is created for each document (typically represented by a unique URL) selected from search results 54 by any user 30, as described hereinbelow with reference to FIGS. 7-8. In general, a DAG represents the interactions with a single document of a plurality of searches conducted by a plurality of users;

a global association graph (GAG), which represents a merger of all or a large portion of the PAGs or their hotspots, as described hereinbelow with reference to FIGS. 7-8. In general, a GAG represents the interactions of a plurality of users with all or a large portion of the document set of a particular deployment of search system 10; and a group association graph (GRAG), which represents a merger of a plurality of correlated PAGs or their hotspots, as described hereinbelow.

Each association graph comprises one or more vertices, each of which is linked to one or more other vertices by respective edges. Furthermore, a vertex may be linked to itself by an edge in some instances, as described hereinbelow. In the art, and in the applications assigned to the assignee of the present application that are incorporated hereinbelow by reference, "vertices" are sometimes referred to as "nodes," and "edges" are sometimes referred to as "arcs" or "links."

An association graph can be represented visually as a plurality of vertices linked (i.e., connected) by lines representing edges, as shown in FIG. 3, or as an adjacency matrix, as described with reference to FIG. 4 in above-mentioned International Patent Application PCT/US07/67103. Search system 10 stores association graphs using one or more data structures. The phrase "association graph," as used herein, including in the claims, includes any data structure that conceptually includes vertices linked by edges, regardless of the nomenclature used to describe the data structure, or how it may be represented, stored, structured, and/or manipulated in memory and/or another storage medium. For some applications, more than one edge links some pairs of vertices. For some applications, the association graph comprises a hypergraph, i.e., a single edge connects more than two vertices. For some applications, the association graph is not directed, i.e., the edges do not include a direction, while for other applications, the association graph is at least partly directed, i.e., at least a portion of the edges include a direction. For some applications, by linking a plurality of directed edges, the search system develops multi-vertex paths of connectivity among vertices.

Each vertex of an associate graph includes a single term, which comprises one or more keywords. Typically, when a term includes a plurality of keywords, the keywords are order-sensitive. In exemplary association graph 100 shown in FIG. 3, a first vertex 110 includes the single-keyword term "physics," while a second vertex 112 includes the single-keyword term "angular." Each edge has a score that represents the strength of the association of the vertices linked by the edge. For example, an edge 114 that links vertices 110 and 112 has a score 116 equal to 90. As mentioned above, a vertex may be linked to itself; for example, vertex 110 has a self-referential score 118 equal to 70. Association scores are typically, but not necessarily, symmetric, i.e., are not directed.

For some applications, to store association graph 100 in memory 24, search system 10 uses the exemplary data structure described with reference to FIG. 5 of above-mentioned International Patent Application PCT/US07/67103.

For clarity of presentation, in the present application, including in the claims, a vertex of an association graph including a term is sometimes referred to simply as the term itself. For example, it may be stated that a first term of an association graph is linked to a second term of the association graph, rather than more verbosely stating that a first vertex of an association graph containing a first term is linked to a second vertex of the association graph containing a second term.

Association Scores

Figure 4:
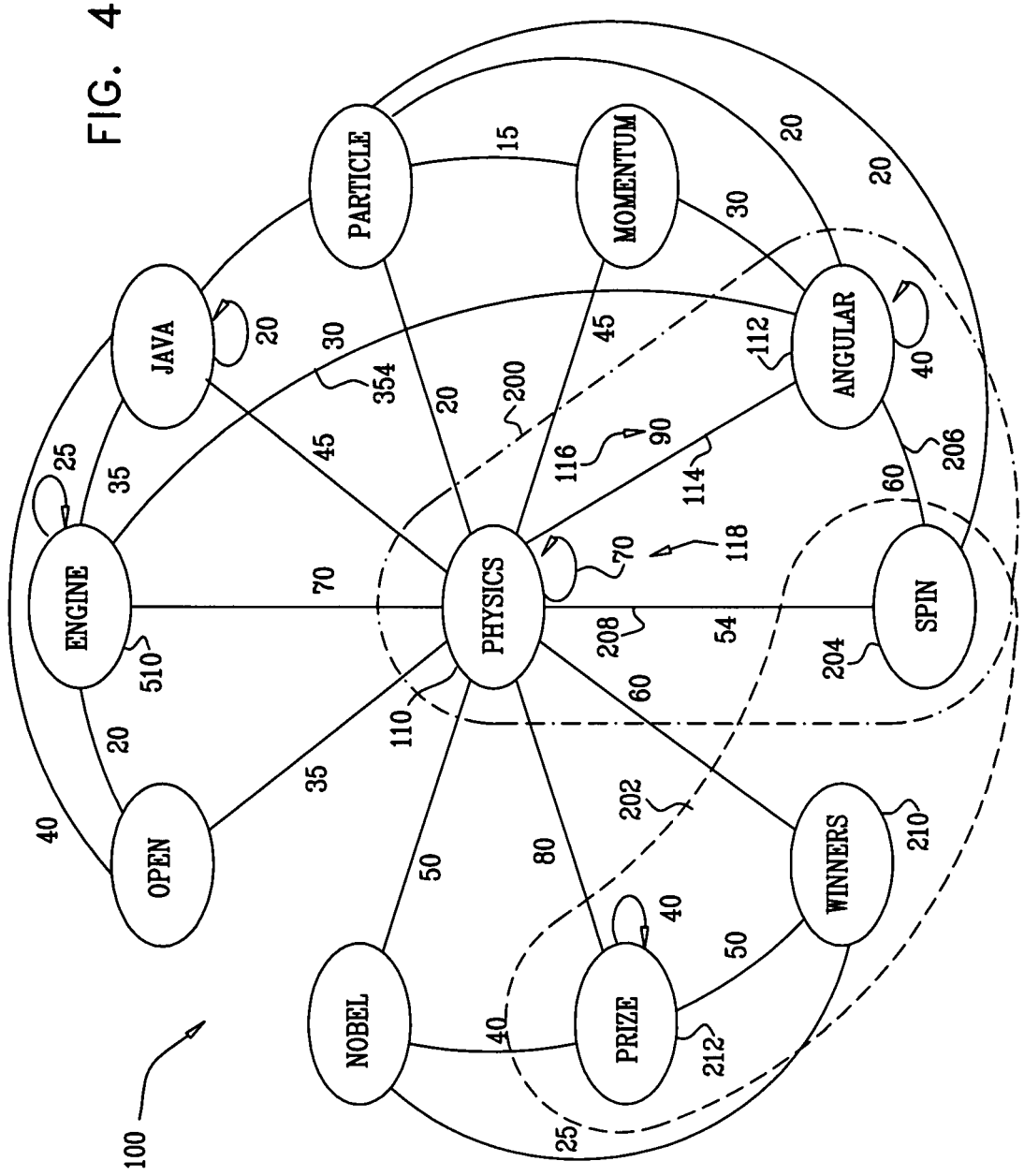
FIG. 4 shows two subgraphs of the association graph of FIG. 3, in accordance with an embodiment of the present invention.

Reference is made to FIG. 4, which shows two subgraphs of association graph 100 of FIG. 3, in accordance with an embodiment of the present invention. Numerous embodiments of the present invention utilize an association score that represents the strength of association among one or more vertices of a subgraph of an association graph. The association score typically takes into consideration both the scores of the edges within the subgraph, and a measure of balance among the scores. Subgraphs having greater balance are considered to have a greater strength of association, ceteris paribus.

In an embodiment of the present invention, the association score of a subgraph of an association graph is (a) positively related to a measure of an average of the edge scores linking the vertices within the subgraph, and (b) inversely related to a measure of variability of the edge scores. For example, the association score of the subgraph may be equal to the quotient of (a) the measure of the average, and (b) the measure of the variability. Optionally, the divisor (b) equals the sum of the measure of the variability and a constant, such as 1. For example, the measure of the average may be an arithmetic mean, a geometric mean, a median, or a mode, and the measure of variability may be a standard deviation or a variance.

For some applications, search system 10 uses the following equation to calculate the association score of a subgraph:

$$\text{association\_score} = \frac{\text{average\_edge\_score}}{\left(1 + \sqrt{\text{var}(\text{edge\_score})}\right)} \quad \text{(Equation 1)}$$

In FIG. 4, exemplary association graph 100 includes first and second subgraphs 200 and 202. Subgraph 200 includes vertices 110 ("physics"), 112 ("angular"), and 204 ("spin"), linked by edges 114, 206, and 208. Applying Equation 1, the association score of subgraph 200 is calculated as:

$$\frac{(90 + 60 + 54)/3}{1 + sqrt[(90-68)^\wedge 2 + (60-68)^\wedge 2 + (54-68)^\wedge 2]} = 68/[1 + sqrt(248)]$$

$$= 4.06$$

If, for example, score 116 of edge 114 were 57 instead of 90, the association score would be 16.52. This higher score reflects the greater balance of subgraph 200, which outweighs the lower average than in the earlier example.

For some applications, the edge scores of the subgraph are normalized before applying Equation 1, typically by dividing each of the edge scores by a normalization factor equal to the greatest edge score in the subgraph, such that each edge score receives a normalized value of between 0 and 1. The result returned by Equation 1 is typically multiplied by the normalization factor. This normalization technique is reflected by the following equation:

$$\text{association\_score} = \text{normalization\_factor} \frac{\text{average\_normalized\_edge\_score}}{\left(1 + \sqrt{\text{var}(\text{edge\_score})}\right)} \quad \text{(Equation 2)}$$

Application of Equation 2 to the exemplary values given above yields the following calculation of the association score of subgraph 200:

$$90 \cdot \frac{(90/90 + 60/90 + 54/90)/3}{1 + sqrt[(1-0.756)^\wedge 2 + (0.667 - 0.756)^\wedge 2 + (0.6 - 0.756)^\wedge 2]} = 90 \cdot 0.756 / [1 + sqrt(0.175)]$$

$$= 57.9$$

Typically, the association score of a subgraph is defined to be zero if not all vertices of the subgraph are linked to all other vertices of the subgraph. The association score of subgraph 202 is thus zero, because vertex 204 ("spin") is linked to neither a vertex 210 ("winners") nor a vertex 212 ("prize") of the subgraph. Alternatively, for some applications, this condition is less rigid. For example, the association score may be non-zero if all of the vertices of the subgraph are linked to at least one other vertex of the subgraph, but not necessarily all of the other vertices of the subgraph.

The Background Processor

Reference is again made to FIG. 2. As mentioned above, background processor 50 collects and analyzes interactions between users 30 and search system 10. Background processor 50 comprises a feedback logger 300 and a feedback processor 302. Search-related events generated by user 30 enter feedback logger 300 in real-time, and the logger appends them to log files stored in at least one log 304, typically with no or minimal processing of the events. Such events include the entry of a search query consisting of one or more search terms into search field 52 of browser 36, selection of search results 54 of browser 36, selection of refinement options 66 of browser 36, and selection of advertisements in advertisement area 72 of browser 36.

Feedback processor 302 retrieves and processes the events stored in log 304. Such processing typically uses a pipeline architecture, in which packages of event data move in the pipeline from processing station to processing station, and are converted and/or integrated into various knowledge components, as described hereinbelow. Typically, the volume of data and the frequency of data transition/computation are reduced as the event data moves along the pipeline. For some applications, feedback processor 302 processes the events using techniques described in Dean J et al., "MapReduce: Simplified Data Processing on Large Clusters," USENIX Association OSDI '04: 6th Symposium on Operating System Design and Implementation, pp. 137-150 (2004), which is incorporated herein by reference.

In some embodiments of the present invention, system 10 processes interaction events using techniques described with reference to FIGS. 7 and 8 in above-mentioned International Patent Application PCT/US07/67103. A search query comprises one or more keywords, and, optionally, operators, such as Boolean operators and quotation marks. As mentioned above, the association graphs of embodiments of the present invention (e.g., PAGs, SAGs, TAGs, DAGs, GRAGs, and the GAG) include vertices, each of which contains a single term. A term comprises one or more keywords, in a particular order. For some applications, feedback processor 302 attempts to resolve the keywords of a search query entered by user 30 into one or more multi-keyword terms, in order to find the best matches between the keywords of the query and the terms stored in the associations graphs. To perform such resolution, the feedback processor checks whether combinations of two or more of adjacent keywords in the query, preserving their order, match any of the vertices in the relevant association graph(s). Optionally, in making this determination, the feedback processor also takes into consideration the association score of the possible multi-keyword term with the other keywords and/or terms of the query.

In some embodiments of the present invention, in order to create and update a PAG, system 10 uses method 450 of above-mentioned International Patent Application PCT/US07/67103, described with reference to FIG. 9 thereof. For some applications, the system uses such techniques to alternatively or additionally create and update a SAG. The system sometimes uses SAGs for users who do not have PAGs, e.g., if the system is unable to track the identify of the users across multiple search sessions, or configured not to perform such tracking. Alternatively or additionally, the system uses SAGs even for users who do have PAGs. The system builds a SAG for a user for each search session, and populates all or a portion of the information from the SAG to the user's PAG, typically at the end of the session. For example, the system may populate only the highest-scoring terms of the SAG to the PAG, and/or may damp the scores of the terms (edge scores and/or self-referential scores) that are transferred to the PAG. For some applications, the system uses the SAG, or both the SAG and the PAG, for search result ranking, as described hereinbelow with reference to FIG. 6, and/or for generating refinement options, as described hereinbelow with reference to FIGS. 8-11.

For some applications, as described with reference to FIG. 9 of above-mentioned International Patent Application PCT/US07/67103, based on the search results the feedback processor adds one or more terms to the user's PAG that were not included in the user's query, and/or increments the scores of one or more terms already in the user's PAG that were not included in the user's query. Each such term includes one or more keywords. Such terms were implicitly included in the topic of the user's search, and thus may be of benefit for characterizing the user's search for future searches by the user or other users, and/or for characterizing the document(s) selected by the user in response to the query.

In order to add such terms and/or increment the scores thereof in the user's PAG, feedback processor 302 identifies one or more terms (each of which includes one or more keywords) that occur most often (and, typically, cross a threshold level of occurrence) in the documents of the search results for the query, or the displayed snippets of the document. (The use of snippets rather than entire documents generally is more meaningful, because the user's selection of a document is based on the words that appear in the snippet, rather than those that appear in the entire document.) To identify these terms, the feedback processor typically uses a "bag of words" approach, as is known in the search engine art. The feedback processor considers each of the terms (which includes one or more keywords) to be a category. The feedback processor assigns a score to each of the categories, which is indicative of the likelihood that the category is meaningful to the topic being searched. The score is typically based on the frequency with which the category appears in the search result snippets, optionally weighted by the position on the list of results of the snippets in which the category is found. This category identification and scoring is typically performed before the user selects one of the documents. For some applications, the category scores are further adjusted based on information from the DAGs of the snippets in which the categories are found, or based on information from a cluster of related DAGs in which each of the DAGs is found.

When the user selects a document from the search results, the feedback processor identifies the categories that appear in the snippet of the document, or, alternatively, the document itself. Optionally, the score of each of the categories is further weighted based on the position of the selected snippet on the results list, typically giving a greater weight for later positions of the selected snippet on the list. The feedback processor adds new vertices to the PAG for any of the terms of these categories that do not already have vertices in the PAG. The feedback processor identifies vertices between (a) each the vertices of the PAG holding the search terms of the query, on the one hand, and (b) each of the vertices of the PAG holding the terms of the categories (whether the vertices were already included in the PAG, or newly added). The edges scores of these vertices are incremented based on respective increment values for each of the categories. For some applications, the category having the greatest category score of those categories in the snippet (or the sole category) is given an increment value equal to a percentage of the increment value calculated at update PAG step 460 of FIG. 9 of above-mentioned International Patent Application PCT/US07/67103, such as between about 25% and about 75%, e.g., about 50%. Each of the other categories (if any) is given a respective increment value equal to the increment value of the greatest category, times the category score of the other category, divided by the category score of the greatest category.

Figure 9:
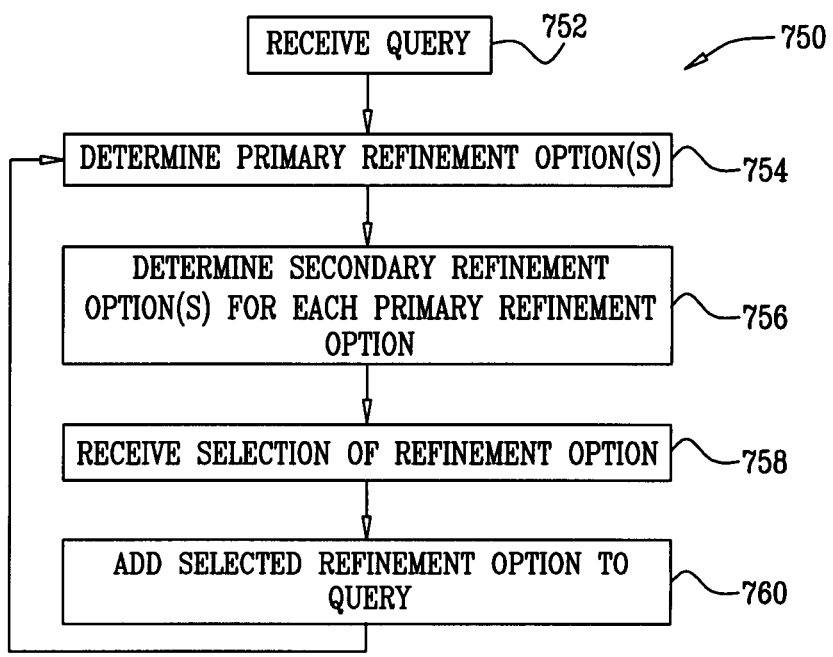
FIG. 9 is a flowchart schematically illustrating a method for presenting refinement options pursuant to a personal-based preference, in accordance with an embodiment of the present invention.

For example, assume exemplary association graph 100 of FIG. 4 is a PAG including a query consisting of the user-entered terms "physics," "angular," and "spin" (comprising subgraph 200), and the edge scores therebetween were incremented by an increment value of 30 at update PAG step 460 of FIG. 9 of above-mentioned International Patent Application PCT/US07/67103. The feedback processor identifies that a snippet selected by the user in response to this query includes the term "particle," which has a category score of 20, and the term "momentum," which has a category score of 10. If not already present, new vertices are added to the PAG for "particle" and "momentum," both of which include edges with vertices 110 ("physics"), 112 ("angular"), and 204 ("spin"). Each of the three edges between "particle" and each of "physics," "angular," and "spin" is incremented by 6, which equals 50% of the increment value of 30 determined at update PAG step 460, and each of the three edges between "momentum" and each of "physics," "angular," and "spin" is incremented by 7.5, which equals 50% times 30 times the category score of "particle" (20), divided by the category score of "momentum" (10). If the identified category term includes a plurality of keywords (e.g., "nobel prize"), a new vertex is added to the PAG which includes the entire multi-keyword term as a single unit.

Typically, edges between the category terms (e.g., between "particle" and "momentum" in the example immediately above) are not incremented. Alternatively, they are incremented, typically after further damping their increment values.

This 25%-75% factor mentioned above serves to damp the contribution of the terms added by inference to the PAG in comparison to those terms added to the PAG by explicit inclusion by the user in a query. Typically, if the query score is later adjusted, the increment values of the category terms are adjusted appropriately. Alternatively, the feedback processor otherwise damps the edge scores of the added terms, such as by multiplying them by a value less than one.

In an embodiment of the present invention, the feedback processor adjusts the score of a category based on the frequency with which the keywords of the category are included in snippets appearing higher on (i.e., closer to the beginning of) the list of snippets than the selected snippet appears. The feedback processor increases the score of the category based on how infrequently the keywords of the category appear in the higher-ranked, non-selected snippets, and decreases the score of the category based on how frequently the keywords of the category appear in the higher-ranked, non-selected snippets. In other words, the processor applies an adjustment factor that is inversely related to a frequency of appearance of the category keywords in higher-ranked, non-selected snippets. The assumption motivating these adjustments is that the user is more likely to have chosen the selected snippet (rather than a higher-ranked snippet) because of the presence of the category keywords if the category keywords do not also appear in higher-ranked snippets.

In some embodiments of the present invention, system 10 extracts hotspots from a PAG using method 500 of above-mentioned International Patent Application PCT/US07/67103, described with reference to FIG. 10 thereof. Techniques described with reference to FIG. 11 thereof may also be used in combination with the techniques described herein.

In some embodiments of the present invention, feedback processor 302 of system 10 creates and maintains a topic index using techniques described with reference to FIG. 8 and 12A-B of above-mentioned International Patent Application PCT/US07/67103.

In some embodiments of the present invention, feedback processor 302 of system 10 creates and maintains TAGs using techniques described with reference to FIG. 13 of above-mentioned International Patent Application PCT/US07/67103. In some embodiments of the present invention, the feedback processor creates and maintains GRAGs using the techniques described in the subsection entitled, "Group association graphs (GRAGs)," of above-mentioned International Patent Application PCT/US07/67103.

The Online Processor

Reference is again made to FIG. 2. As mentioned above, online processor 60 provides online services to users 30, including search services, refinement services, and advertising services. Each of these services is now described in detail.

The Internal Search Processor

Figure 5:
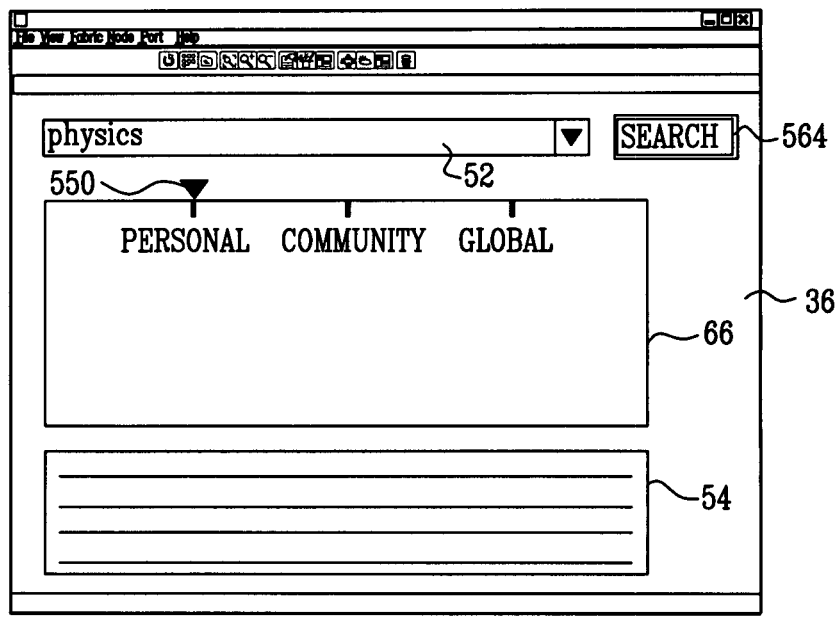
FIG. 5 is a schematic illustration of an exemplary screenshot of a browser including a search field and search results, in accordance with an embodiment of the present invention.

Reference is made to FIG. 5, which is a schematic illustration of an exemplary screenshot of browser 36 including search field 52 and search results 54, in accordance with an embodiment of the present invention. In general, internal search processor 62 of online processor 60 (FIG. 2) receives a search query in search field 52, and, responsively to the query, presents search results 54, typically as snippets from each of the documents in the search results. The search query typically includes one or more terms that are initially organized linearly in search field 52 (each of the terms includes one or more keywords).

Each snippet includes one or more of the keywords of the query, and the URL of the document. Using the techniques described herein, internal search processor 62 ranks and orders the results based on characteristics of the particular user, one or more communities to which the user belongs, and/or global characteristics of all of the users of the particular deployment of search system 10. For some applications, user 30 selects a desired preference regarding which of these characteristics should be used for ranking, such as by using a sliding pointer 550, or other means that will be evident to those skilled in the art who have read the present application.

Such preferences typically include one or more of:
- a personal-based preference—internal search processor 62 determines the ranking of search results based at least in part on user-specific information, typically as reflected in PAG 374 of the user, as described hereinbelow with reference to FIG. 6;
- a community-based preference—internal search processor 62 determines the ranking of search results based at least in part on community-specific information, typically as reflected in one or more TAGs 392 associated with the user and/or the query, as described hereinbelow; and
- a global-based preference—internal search processor 62 determines the ranking of search results based at least in part on information regarding all or a large portion of the users of the particular deployment of search system 10, typically as reflected in GAG 396.

In an embodiment of the present invention, user 30 is able to select a mixture of two or more of the preferences, for example by positioning sliding pointer 550 between two of the preferences. Internal search processor 62 ranks the search results based on a combination of the selected preferences, typically weighted by the position of the slider. For some applications, internal search processor 62 combines the selected preferences by normalizing the scores calculated below at matrix correlation calculation step 572 at least partially responsively to the position of the slider.

For some applications, internal search processor 62 stores and indexes snippets from documents that were selected from search results, typically together with the search query from which the search results were generated. For example, the internal search processor may use the Apache Lucene search engine (distributed by the Apache Software Foundation) for such storing and indexing.

Figure 6:
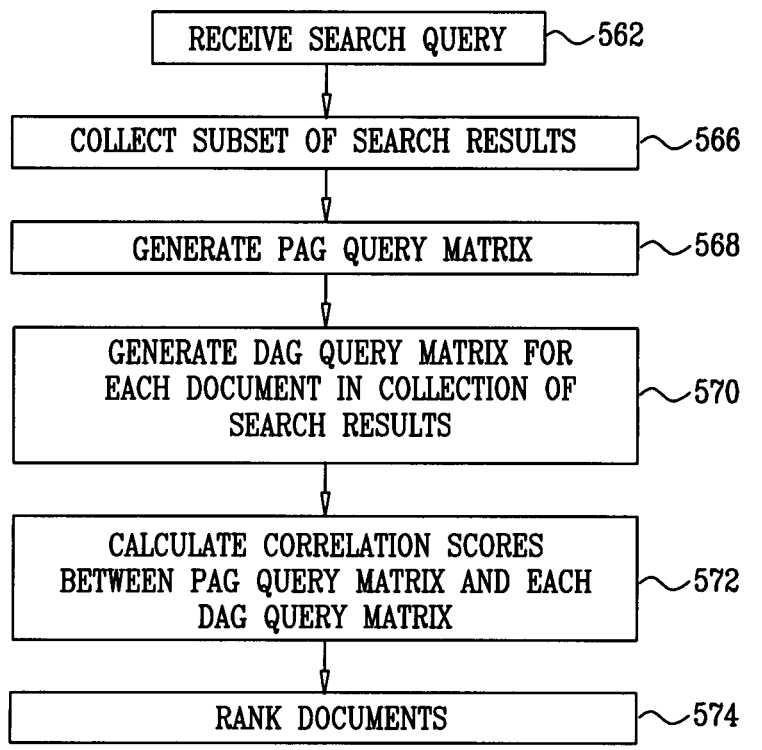
FIG. 6 is a flowchart schematically illustrating a method for performing a search and ranking the results thereof pursuant to a personal-based preference, in accordance with an embodiment of the present invention.

Reference is made to FIG. 6, which is a flowchart schematically illustrating a method 560 for performing a search and ranking the results thereof pursuant to a personal-based preference, in accordance with an embodiment of the present invention. At a query receipt step 562, internal search processor 62 receives a search query from user 30, typically via search field 52. Typically, the user 30 types in the keywords, and/or selects refinement options for addition to the query, such as described hereinbelow with reference to FIGS. 8-11. For some applications, the query is only searched when the user gives an instruction to execute the search, such as by clicking on a search button 564 (FIG. 5). Alternatively, preliminary search results are displayed to the user in real time as the user enters keywords into the search field.

Internal search processor 62 collects a subset of all search results for the search query, at a subset result collection step 566. As mentioned hereinabove, for some applications, search server 20 utilizes search results obtained from an external search engine 40, while for other applications, search system 10 comprises a search engine that performs the search functionality of external search engine 40. In either case, for most typical queries, the search engine returns thousands, or even millions, of results. At step 566 internal search processor 62 collects a portion of these results expected to be potentially of particular relevance to the query, and then ranks this portion for presentation to user 30.

In order to collect the portion of the search results, internal search processor 62 generates a plurality of search engine search queries based on the search query of user 30, and separately sends each of these search engine search queries to the search engine (e.g., external search engine 40). The internal search processor adds to the collection the top n results of each of these searches, as ranked by the search engine. Typically, n is between about 50 and about 150, such as about 100. For some applications, n is different for each of the search engine search queries.

The search engine search queries based on the search query include one or more of the following:
- the search query of user 30 itself, i.e., without any further processing;
- one or more PAG-based search engine search queries—each of which consists of the search query of user 30, with the separate addition of each of the terms in the user's PAG 374 that are directly linked to all of the terms in the search query. (As mentioned above, each term consists of one or more keywords.) In other words, the internal search processor creates a separate expanded search engine search query for each of these terms in the user's PAG, and separately sends each of these expanded search engine search queries to the search engine. Alternatively, if two or more of these terms in the user's PAG are highly associated with one another, these two or more terms are together added to the search query to generate a single expanded search engine search query for the terms. For some applications, the internal search processor creates expanded search engine search queries for only the portion of the linked terms within the PAG which have the greatest association scores with the search query of user 30;
- one or more user-hotspot-based search engine search queries—each of which consists of the search query of user 30, with the separate addition of the high point term of each hotspot of the user's PAG 374. (As mentioned above, each term consists of one or more keywords.) In other words, the internal search processor creates a separate search engine search query for each of these high point terms, and separately sends each of these expanded search engine search queries to the search engine. Alternatively, the internal search processor creates expanded search engine search queries for only the portion of the high point terms whose hotspots have the greatest association scores within the PAG. For some applications, the internal search processor creates an expanded search engine search query only for each of the high point terms that the internal search processor validates against GAG 396 and/or one or more query-related TAGs 392. The internal search processor typically performs such validation by checking that all of the terms of the query and the high point term are linked in the GAG and/or query-related TAGs; and
- one or more SAG-based search engine search queries—each of which consists of the search query of user 30, with the separate addition of each of the terms in the user's SAG that are directly linked to all of the terms in the search query. In other words, the internal search processor creates a separate expanded search engine search query for each of these terms in the user's SAG, and separately sends each of these expanded search engine search queries to the search engine. Alternatively, if two or more of these terms in the user's SAG are highly associated with one another, these two or more terms are together added to the search query to generate a single expanded search engine search query for the terms. For some applications, the internal search processor creates expanded search engine search queries for only the portion of the linked terms within the SAG which have the greatest association scores with the search query of user 30. Such SAG-based query expansion generally provides a good indication of the user's current state of mind, which may be different than the user's general interests as reflected in the user's PAG. In addition, such SAG-based query expansion may serve as a substitute for PAG-based query expansion for users who do not have PAGs, such as if the system is unable to track the identify of a user over multiple search sessions, or is configured not to perform such tracking.

At a PAG query matrix generation step 568, internal search processor 62 generates one or more subgraphs of the user's PAG, each of which consists of all of the terms of the search query plus one or more terms of the PAG that are most highly linked in the PAG to all of the terms of the search query, typically as determined using the association scores of the subgraph consisting of the query terms plus each candidate term directly linked to all of the query terms in the PAG. The internal search processor determines the number of such terms to add to the subgraphs based on the strength of the association scores of each of the terms with the terms of the search query. If the user's PAG does not include all of the terms of the search query, internal search processor 62 typically cannot perform a personal ranking of the search results. This generally occurs when a search query represents an interest of the user not expressed in previous searches conducted by the user using the particular deployment of the search system 10.

Internal search processor 62 represents each of the subgraphs as an adjacency matrix, using techniques described with reference to FIG. 4 of above-mentioned International Patent Application PCT/US07/67103. Typically, the internal search processor establishes an order of the terms of the matrix beginning with the terms of the search query entered by the user, followed by the other remaining terms of the subgraph in descending order of their association scores with the terms of the search query.

At a DAG query matrix generation step 570, internal search processor 62 generates a matrix for each DAG 400 associated with each of the search result documents collected at step 566 above, for each of the PAG adjacency matrices generated at step 568 above. The size of each of the DAG matrices is set to match the size of the respective PAG matrix generated at step 568 above. The strongest terms of the DAG are included in the DAG matrix.

At a matrix correlation calculation step 572, internal search processor 62 calculates respective correlation scores between each of the PAG matrices generated at step 568 and each of the DAG matrices generated at step 570. Numerous techniques for calculating such scores will be evident to those skilled in the art who have read the present application. For example, such scores may be based on the scalar product of the PAG and DAG matrices. For some applications, when calculating the scores, greater weight is given to diagonals or values near the main diagonal. For some applications, terms that are absent from the PAG or DAG matrix are given reduced weights. For some applications, influence weights are assigned to the terms of PAG matrices responsively to a maturity of the PAG, calculated for example using Equation 6, mutatis mutandis.

For some applications, internal search processor 62 uses the following equation to the correlation score between a PAG matrix and a DAG matrix:

$$\text{Correlation score} = \sum_{\forall i,j} DAGM_{i,j} * PAGM_{i,j} \alpha^{|i-j+1|} \quad \text{(Equation 3)}$$

wherein DAGM is the DAG matrix, and PAGM is the PAG matrix.

In an embodiment of the present invention, internal search processor 62 calculates a DAG query score for each DAG 400 associated with each of the search result documents collected at step 566 above. These DAG query scores are used at ranking step 574 hereinbelow. The DAG query score is a measure of correlation between the terms of the search query and the DAG. For some applications, the DAG query score is calculated responsively to an association score of the terms of the search query (as a subgroup) within the DAG, for example calculated using techniques described hereinabove with reference to FIG. 4. For other applications, the internal search processor calculates the DAG query score by building a matrix that represents the association scores between every two query terms in the DAG. For example, internal search processor 62 may use the following equation for calculating the DAG query score:

$$DAG \text{ query score} = \sum_{\forall i,j} W_{i,j} * \alpha^{|i-j+1|} \quad \text{(Equation 4)}$$

$$(0 \le i < n), (i \le j < n)$$

wherein $W_{i,j}$ is the association score between query terms $q_1$ and $q_2$, and a is constant, typically between 0 and 1, such as about 0.5.

For some applications, the resulting DAG query score is multiplied by a scaling factor β. For example, the scaling factor may be calculated using the following equation:

$$\beta = AQT/MS*(DAG \text{ maturity}) \quad \text{(Equation 5)}$$

wherein AQT is an average query term (the average to total score in the DAG of the query terms), MS is a maximum total score (the highest total score (of the strongest term) in the DAG), and DAG maturity reflects a level of maturity of the DAG. For example, if it is assumed that a mature DAG has about 500 vertices, the DAG maturity may be calculated using the following equation:

$$DAG \text{ maturity} = \sqrt{1 + \frac{\text{\# of terms in the } DAG}{500}} \quad \text{(Equation 6)}$$

At a ranking step 574, internal search processor 62 assigns a ranking score to each of the search result documents collected at step 568 above. The ranking scores typically are based on a combination of one or more of the following elements:

- a voting score, typically how many times a given document has been selected for viewing by any user of the particular deployment of search system 10;
- the DAG query score, as described hereinabove; and
- the PAG/DAG matrix correlation scores calculated at step 572 above.

For some applications, internal search processor 62 calculates the ranking score of each of the search result documents collected at step 566 above by summing the voting score, DAG query score, and PAG/DAG matrix correlation scores for the document. Alternatively, only one or two of these scores are included in the sum. Typically, before summing the scores, internal search processor 62 normalizes the scores by:

- calculating the average of all voting scores for the top n documents
- calculating the average of all DAG query score for the top n documents;
- calculating the average of all PAG/DAG matrix correlation scores for the top n documents;
- finding the maximum value of the three averages;
- finding a coefficient for the other two average values, equal to the maximum value divided by each of the respective other two averages; and
- normalizing the values of the two scores having the coefficients by multiplying these values by their respective coefficients.

Internal search processor 62 typically combines these internal rankings with the rankings generated by the search engine (e.g., external search engine 40) in response to the user's search query. In some deployments (particularly early in the deployment), only a portion of the search result documents generated by the external search engine have sufficiently mature DAGs to generate the ranking scores described above. The internal search processor therefore relies on a combination of the ranking scores assigned by the external search engine, and, for those documents assigned a ranking score as described, a combination of the external ranking score and this assigned ranking score.

For some applications, the internal search processor performs this combining by taking the external rankings and modifying the ranking of those that have internal rankings (calculated as described above) responsively to such internal rankings. For example, the internal search processor may use the following method to perform such re-ranking:

- normalizing the internal scores calculated as described above. For example, if the search result document with the highest score has a score of x, the normalized score of each other page may be set to (k/x*non-normalized score), where k is a constant such as 100;
- getting the positional rank of each search result document in the list of search result documents (or portion of thereof being used) generated by the external search engine; and
- for each document on the externally-generated list having an internal score, re-ranking the document responsively to the normalized internal score, such as by using the following equation:

$$\text{new rank (i.e., position in search result list)} = \text{(external position)} - \frac{\text{(external position)}}{2} * \left(\frac{\text{internal normalized score}}{100}\right) = (EP)\left(1 - \frac{(IS)}{200}\right)$$

(Equation 7)

For some applications, if two documents receive the same re-ranking position, the document with the highest original position on the externally-generated list is positioned earlier on the newly ranked list.

In an embodiment of the present invention, internal search processor 62 determines a community-based ranking of the search results using the techniques of method 560, described hereinabove with reference to FIG. 6, except that the internal search processor substitutes one or more TAGs 392 for the PAG used in method 560. The internal search processor selects one or more TAGs that may be a good source of ranking information. Minimally, in order for a TAG to be a candidate, the TAG must include all of the terms in the query.

Typically, to select the candidate TAGs, internal search processor 62 determines one or both of top query-associated TAGs, and top user-associated TAGs. Typically, the internal search processor determines the top query-associated TAGs using techniques described hereinbelow at query-associated TAG determination step 806 of method 800, described with reference to FIG. 10, and the top user-associated TAGs using techniques described hereinbelow at user-associated TAG determination step 808 of method 800, mutatis mutandis. For some applications, these TAGs are used separately to generate search results from the search engine, while for other applications they are combined, such as described at step 810 of method 800, described hereinbelow with reference to FIG. 10. For some applications, internal search processor 62 substitutes one or more the above-mentioned TAGs for the PAG at PAG query matrix generation step 568.

In an embodiment of the present invention, to determine the community-based ranking using the techniques of method 560, the search engine queries performed by internal search processor 62 include one or more GRAG-based search engine search queries. Each of these queries consists of the search query of user 30, with the separate addition of each of the terms in each of the GRAGs to which user 30 belongs that are directly linked to all of the terms in the search query. (As mentioned above, each term consists of one or more keywords.) In other words, the internal search processor creates a separate expanded search engine search query for each of these terms in the GRAGs, and separately sends each of these expanded search engine search queries to the search engine. For some applications, the internal search processor creates expanded search engine search queries for only the portion of the linked terms within the GRAG which have the greatest association scores with the search query of user 30. The addition of terms from GRAGs is particularly useful when the user's search query includes terms not in the user's PAG. In this case, the GRAGs may provide additional terms that are relevant to users who have similar PAGs to the PAG of the searching user. For some applications, terms are added from GRAGs only when the user's PAG cannot adequately provide additional terms. For some applications, internal search processor 62 substitutes one or more the above-mentioned GRAGs, or TAGs mentioned in the previous paragraph, for the PAG at PAG query matrix generation step 568.

In an embodiment of the present invention, internal search processor 62 determines a global-based ranking of the search results using the techniques of method 560, described hereinabove with reference to FIG. 6, except that the internal search processor substitutes a subgraph of GAG 396 for the PAG used in method 560. The subgraph typically consists of the search terms of the user's search query plus all or a portion of the terms of the GAG that are directly linked to all of the search terms. For some applications, internal search processor 62 substitutes the subgraph of the GAG for the PAG at PAG query matrix generation step 568.

Figure 7:
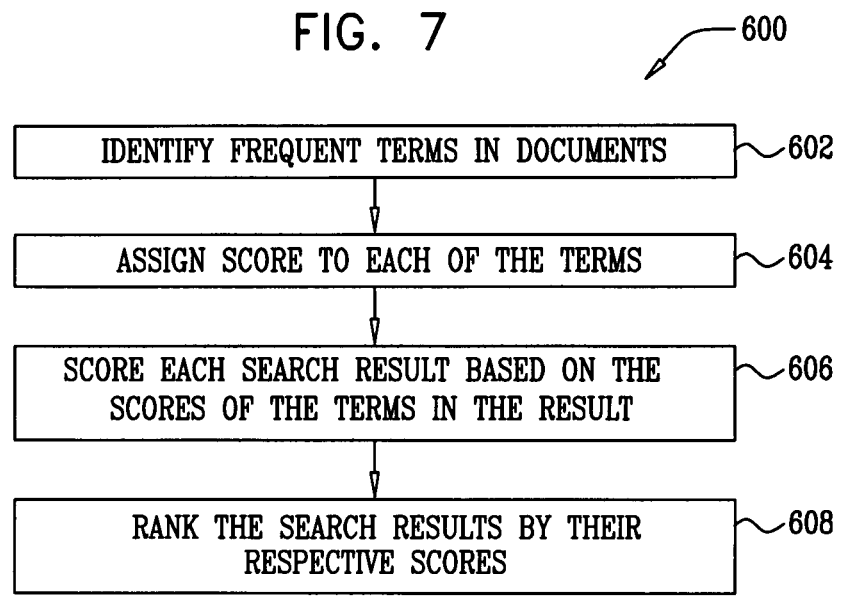
FIG. 7 is a flowchart schematically illustrating a method for ranking search results, in accordance with an embodiment of the present invention.

Reference is made to FIG. 7, which is a flowchart schematically illustrating a method 600 for ranking search results, in accordance with an embodiment of the present invention. In this embodiment, internal search processor 62 uses this method in combination with or instead of the ranking techniques described hereinabove with reference to FIG. 6, and/or other ranking techniques described herein.

The internal search processor begins method 600 by identifying one or more terms (each of which includes one or more keywords) that occur most often (and, typically, cross a threshold level of occurrence) in the documents of the search results for the query, or the displayed snippets of the document, at an identification step 602. (The use of snippets rather than entire documents generally is more meaningful, because the user's selection of a document is based on the words that appear in the snippet, rather than those that appear in the entire document.) To identify these terms, the processor typically uses a "bag of words" approach, as is known in the search engine art.

At a term scoring step 604, the processor assigns a score to each of the terms, which is indicative of the likelihood that the term is meaningful to the topic being searched. The score is typically based on the frequency with which the term appears in the search result snippets. The scoring optionally more heavily weights terms that appear in the title of a snippet, rather than the body of the snippet, e.g., by applying a weighting factor of 4. Alternatively or additionally, the scoring optionally applies a greater weight to terms appearing in higher positions on the list of results of the snippets in which the term is found, e.g., using a Zipfian distribution. For some applications, the scores of the terms are further adjusted based on information from the DAGs of the snippets in which the terms are found, or based on information from a cluster of related DAGs in which each of the DAGs is found.

The processor scores each search result snippet based on the scores of the terms that appear in the snippet, at a snippet scoring step 606. For example, the processor may perform such scoring by summing the scores of the terms that appear in the snippet, optionally giving greater weight to terms that appear in the title of the snippet. At a ranking step 608, the processor ranks the search results by their respective scores. Alternatively, the processor scores the search results based on the scores of the terms that appear in the full text of the search result document, rather than just in the snippet of the document.

In an embodiment of the present invention, internal search processor 62 uses latent semantic analysis (LSA) to rank the search results, as is known in the search engine art. In this embodiment, the processor uses LSA in combination with or instead of the ranking techniques described hereinabove with reference to FIG. 6 and/or FIG. 7, and/or other ranking techniques described herein.

In an embodiment of the present invention, internal search processor 62 uses latent Dirichlet allocation (LDA) to rank the search results. In this embodiment, the processor uses LDA in combination with or instead of the ranking techniques described hereinabove with reference to FIG. 6 and/or FIG. 7, and/or other ranking techniques described herein. The processor identifies terms included in the snippets of the search results, and distributes these terms over a set of topics, by finding which of the terms are associated with which of the topics. Each snippet is characterized as a distribution over one or more of these topics, by calculating a weight of each of the topics for the snippet. The processor constructs an affinity matrix for the snippets, which reflects the similarity of each of the snippets with each of the other snippets based on the topics associated with the snippets. The processor then treats the new query as a snippet, and calculates a correlation score of the query snippet with the other snippets, based on the topics associated with the query snippet and each of the other snippets. The processor ranks the search results based on these correlation scores.

In an embodiment of the present invention, internal search processor 62 ranks search results based on the information retrieved from association graphs and/or contextual analysis of documents and/or snippets, as described hereinbelow and/or using techniques described in above-mentioned U.S. Provisional Patent Application 60/829,132, which is assigned to the assignee of the present application and is incorporated herein by reference.

In this embodiment, the processor identifies potentially relevant terms from one or more relevant association graphs using one or both of the following techniques:

the processor extracts user-relevant terms by identifying, in the relevant association graphs, terms that are directly linked in the association graph to all of the terms of the query. The processor calculates association scores within the association graph for the respective combinations of the query terms and each of the identified directly-linked terms. The processor determines which of the association graphs (e.g., SAG, PAG, user-related TAGs, query-related TAGs, and/or GAG) to use, and/or the respective weight of each of these association graphs, based on the degree of personalization, selected explicitly or implicitly by the user, as described hereinabove; and/or the processor extracts user-relevant interests or preferences from the hotspots of the user's PAG, SAG, and/or user-related TAGs. These terms are not necessarily related to or directly linked within the association graph(s) with the terms of the query. For some applications, all the terms appearing in a user's SAG and/or PAG are extracted.

The processor validates that each of the extracted terms are query-related, using global information sources such as the GAG or TAGs to determine the relevancy of each of the extracted terms to the query. For example, the processor may calculate the association scores in the global information source association graph of the respective combinations of the search query terms and each of the extracted terms. The processor considers as relevant only those extracted terms having at least a threshold association score.

The processor uses the relevant extracted terms in order to expand the query originally submitted by the user (i.e., narrow the query by separately adding each of the relevant extracted terms), so as to better reflect the user's interests, and/or to disambiguate the submitted query, for example as described at step 566 of method 560, described hereinabove with reference to FIG. 6.

The Refinement Processor

Figure 8:
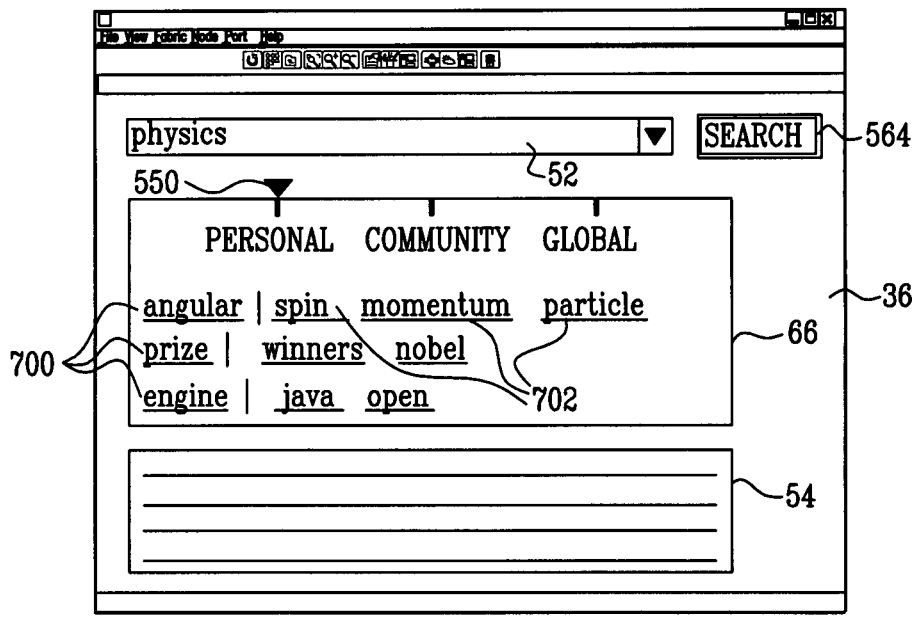
FIG. 8 is a schematic illustration of an exemplary screenshot of a browser including refinement options, in accordance with an embodiment of the present invention.

Reference is made to FIG. 8, which is a schematic illustration of an exemplary screenshot of browser 36 including refinement options 66, in accordance with an embodiment of the present invention. As mentioned above, refinement processor 64 of online processor 60 (FIG. 2) provides refinement options 66 in browser 36. Refinement options 66 are displayed on the main web page in the browser, in a dropdown list, in a window or frame in the browser, in a popup window, or otherwise as is known in the art.

As keywords or terms are added to search field 52 (either by user 30 typing in the keywords, or selecting previously presented refinement options for addition to the query), refinement processor 64 provides refinement options 66 in real-time or close to real-time. For some applications, refinement options 66 comprise primary refinement options 700, and secondary refinement options 702 for at least a portion of the primary refinement options. The primary refinement options are those options that are most closely related to the search query, and the secondary refinement options are those options that are more distantly related to the search query, and are also related to their associated primary refinement option. For some applications, the refinement options comprise additional levels, which are typically hierarchical. For example, the refinement options may include tertiary refinement options for at least a portion of the secondary refinement options, which are still more distantly related to the search query, ad are also related to the their associated primary and secondary refinement options. For some applications, refinement processor 64 drives web server 22 to display the secondary, tertiary, and any additional levels of refinement options using a hierarchical presentation structure, such as a tree.

In the exemplary screenshot shown in FIG. 8, the search query consists of "physics," and primary refinement options 700 consist of "angular," "prize," and "engine." Secondary refinement options 702 for "angular" consist of "spin," "momentum," and "particle."

In an embodiment of the present invention, search system 10 provides user 30 with a plurality of preferences for how refinement processor 64 determines which refinement options 66 to provide, and the ordering of the options. For some applications, user 30 selects the desired preference using sliding pointer 550, or other means that will be evident to those skilled in the art who have read the present application. Typically, the same sliding pointer 550 is provided for selecting refinement preferences as for selecting ranking preferences, as described hereinabove with reference to FIG. 5. Alternatively, separate sliding pointers are provided for indicating these preferences separately.

Such preferences typically include one or more of:
- a personal-based preference—refinement processor 64 determines which refinement options 66 to provide based on user-specific information, typically as reflected in PAG 374 of the user, as described hereinbelow with reference to FIG. 9, and/or in the SAG of the user, using similar technique;
- a community-based preference—refinement processor 64 determines which refinement options 66 to provide based on community-specific information, typically as reflected in one or more TAGs 392 associated with the user and/or the query, as described hereinbelow with reference to FIG. 10; and
- a global-based preference—refinement processor 64 determines which refinement options 66 to provide based on information regarding all or a large portion of the users of the particular deployment of search system 10, typically as reflected in GAG 396, as described hereinbelow with reference to FIG. 11.

In an embodiment of the present invention, user 30 is able to select a mixture of two or more of the preferences, for example by positioning sliding pointer 550 between two of the preferences. Refinement processor 64 provides refinement options 66 based on a combination of the selected preferences, typically weighted by the position of the slider. For some applications, the weighting is performed by setting the number of refinement options contributed by each of the preferences responsively to the relative position of the slider between the preferences.

Reference is made to FIG. 9, which is a flowchart schematically illustrating a method 750 for presenting refinement options 66 pursuant to a personal-based preference, in accordance with an embodiment of the present invention. In this embodiment, refinement processor 64 determines which refinement options 66 to provide based on user-specific information, typically as reflected in PAG 374 of the user. Method 750 begins with the receipt of a search query by refinement processor 64, at a query receipt step 752. As mentioned above, a query consists of a one or more terms, each of which consists of one or more keywords. Although the query is typically displayed as a list of keywords, search system 10 typically stores the query as a collection of terms, each of which may include more than one keyword. For some applications, before refinement processor 64 presents the refinement options, internal search processor 62 automatically executes a search of the query, while for other applications, the query is searched only if the user gives an instruction to execute the search, such as by clicking on search button 564.

At a primary refinement options determination step 754, refinement processor 64 determines which primary options 700 (FIG. 8) to present to the user. Typically, refinement processor 64 determines a set of candidate refinement options by identifying all vertices of PAG 374 of the user that are directly linked to all of the terms of the query. For example, if we assume that association graph 100 of FIG. 3 represents the PAG of the user, and the query consists of "physics," refinement processor 64 would determine the following candidate refinement options: "spin," "angular," "momentum," "particle," "Java," "engine," "open," "nobel," "prize," and "winners." Refinement processor 64 ranks these candidates, typically by: (a) creating respective subgraphs of the PAG consisting of the search terms (in this example, "physics") and the respective candidate refinement option, and (b) calculating an association score for each of the subgraphs, typically using techniques described hereinabove with reference to FIG. 4. The refinement processor typically selects as primary refinement options 700 the candidates with the top n scores, e.g., n equals 1, 2, 3, 4, or 5. In example shown in FIG. 8, n=3 and the candidates "angular," "prize," and "engine" have the top three scores, and are thus selected as primary refinement options 700. Alternatively, the refinement processor selects as primary refinement options 700 the candidates that have at least a threshold association score, or the candidates with the top n scores that also have at least the threshold association score.

The refinement options (primary and secondary) sometimes include at least one multi-keyword term, which, for some applications, is presented to the user as a unified term (e.g., the multiple keywords are underlined together), and, for other applications, is presented to the user as separate keywords.

At a secondary refinement options determination step 756 (which is optional), refinement processor 64 determines which secondary options 702 (FIG. 8) to present to the user for each of primary refinement options 700 determined at step 754. Typically, for each given primary refinement option 700, refinement processor 64 determines a set of candidate secondary refinement options by identifying all vertices of PAG 374 of the user that are directly linked to all of the terms of the query and the given primary refinement option. For example, if we assume that association graph 100 of FIG. 3 represents the PAG of the user, the query consists of "physics," and the given primary refinement option is "angular," refinement processor 64 would determine the following candidate secondary refinement options: "spin," "momentum," and "particle," and "engine." Refinement processor 64 ranks these candidates, typically by: (a) creating respective subgraphs of the PAG consisting of the search terms (in this example, "physics"), the given primary refinement option (in this example, "angular"), and the respective candidate secondary refinement option, and (b) calculating an association score for each of the subgraphs, typically using techniques described hereinabove with reference to FIG. 4. The refinement processor typically selects as primary refinement options 700 the candidates with the top m scores, e.g., m equals 1, 2, 3, 4, or 5. In example shown in FIG. 8, m=2 and the candidates "spin" and "momentum" have the top two scores, and are thus selected as secondary refinement options 702 for the primary refinement option "angular." Alternatively, the refinement processor selects as secondary refinement options 702 the candidates that have at least a threshold association score, or the candidates with the top m scores that also have at least the threshold association score.

User 30 selects one of the refinement options (typically by clicking on it), at a refinement option selection step 758. The selected refinement option is added to the query, at a query refinement step 760. Multi-keyword term refinement options are typically added to the query as a single term. For some applications, internal search processor 62 automatically executes a search of the refined query, while for other applications, the refined query is only searched if the user gives an instruction to execute the search, such as by clicking on search button 564. In either case, method 750 generates new refinement options responsively to the refined query, by returning to step 754.

Reference is made to FIG. 10, which is a flowchart schematically illustrating a method 800 for presenting refinement options 66 pursuant to a community-based preference, in accordance with an embodiment of the present invention. In this embodiment, refinement processor 64 determines which refinement options 66 to provide based on community-specific information, typically as reflected in one or more TAGs 392 associated with the user and/or the query. Method 800 begins with the receipt of a query by refinement processor 64, at a query receipt step 752. For some applications, before refinement processor 64 presents the refinement options, internal search processor 62 automatically executes a search of the query, while for other applications, the query is only searched if the user gives an instruction to execute the search, such as by clicking on search button 564.

At a candidate TAG selection step 804, refinement processor 64 selects one or more TAGs 392 that may be a good source of refinement options 66. Minimally, in order for a TAG to be a candidate, the TAG must include all of the terms in the query. Typically, to select the candidate TAGs, refinement processor 64 determines one or both of top query-associated TAGs, at a query-associated TAG determination step 806, and top user-associated TAGs, at a user-associated TAG determination step 808.

In an embodiment of the present invention, to determine the top query-associated TAGs, refinement processor 64 identifies all TAGs that contain all of the terms of the query. The refinement processor ranks the identified TAGs. For example, the ranking may be based on a comparison of the query with the term-group (topic ID) of each of the TAGs, or the association score of the subgraph of each of the TAGs which subgraph includes the terms of the query. The refinement processor selects the top n ranked TAGs (e.g., 5), and/or TAGs having at least a threshold comparison score with the query.

In an embodiment of the present invention, to determine the top user-associated TAGs, refinement processor 64 identifies all TAGs that contain all of the terms of the query, and to which the user contributed (i.e., terms and/or edge scores from the user's PAG were added to the TAG, typically via topic index 382, as described with reference to FIG. 13 of above-mentioned International Patent Application PCT/US07/67103). The refinement processor scores each of the identified TAGs, typically based on: (a) the user's contribution to the TAG's term-group (topic ID) score in relation to the TAG's total term-group score; (b) the association score of the TAG's term-group (topic ID) in the user's PAG; or (c) a combination of (a) and (b). For example, the combination may be calculated by taking the product of (a) and (b), the product of (b) and the square root of (a), or the product of (a) and the square root of (b). The refinement processor selects the top m ranked TAGs (e.g., 5), and/or TAGs having at least a threshold score.

At a TAG merger step 810, refinement processor 64 merges all of the candidate TAGs identified at candidate TAG selection step 804, to generate a merged community association graph. Alternatively, for each TAG the refinement processor generates a subgraph that consists of all terms in the TAG that are directly linked to all of the terms of the query. The refinement processor merges these subgraphs to generate the community association graph.

At a refinement option determination step 812, refinement processor 64 determines one or more primary refinement options 700, and, optionally, one or more secondary refinement options 702. The refinement processor typically uses the techniques described hereinabove at steps 754 and 756 of method 750, described with reference to FIG. 9, except that the refinement processor analyzes the merged community association graph instead of the user's PAG.

User 30 selects one of the refinement options (typically by clicking on it), at a refinement option selection step 814. The selected refinement option is added to the query, at a query refinement step 816. For some applications, internal search processor 62 automatically executes a search of the refined query, while for other applications, the refined query is only searched if the user gives an instruction to execute the search, such as by clicking on search button 564. In either case, method 800 generates new refinement options responsively to the refined query, by returning to step 804.

In an embodiment of the present invention, the refinement processor performs method 800 using one or more GRAGs instead of TAGs.

Reference is made to FIG. 11, which is a flowchart schematically illustrating a method 830 for presenting refinement options 66 pursuant to a global-based preference, in accordance with an embodiment of the present invention. In this embodiment, refinement processor 64 determines which refinement options 66 to provide based on information regarding all or a large portion of the users of the particular deployment of search system 10, typically as reflected in GAG 396.

Method 830 begins with the receipt of a query by refinement processor 64, at a query receipt step 832. For some applications, before refinement processor 64 presents the refinement options, internal search processor 62 automatically executes a search of the query, while for other applications, the query is only searched if the user gives an instruction to execute the search, such as by clicking on search button 564.

At a refinement option determination step 834, refinement processor 64 determines one or more primary refinement options 700, and, optionally, one or more secondary refinement options 702. The refinement processor typically uses the techniques described hereinabove at steps 754 and 756 of method 750, described with reference to FIG. 9, except that the refinement processor analyzes GAG 396 instead of the user's PAG.

User 30 selects one of the refinement options (typically by clicking on it), at a refinement option selection step 836. The selected refinement option is added to the query, at a query refinement step 838. For some applications, internal search processor 62 automatically executes a search of the refined query, while for other applications, the refined query is only searched if the user gives an instruction to execute the search, such as by clicking on search button 564. In either case, method 800 generates new refinement options responsively to the refined query, by returning to step 834.

In some embodiments of the present invention, system 10 integrates search results 54 with refinement options 66, using the techniques described with reference to FIG. 20 of above-mentioned International Patent Application PCT/US07/67103.

Reference is made to FIG. 12, which is a flowchart schematically illustrating a method 1000 for presenting refinement options that include search term replacements, in accordance with an embodiment of the present invention. In this embodiment, refinement processor 64 is configured to present suggested replacements of one or more terms of the search query with substitute terms that may better express the intended search interest of user 30. Replacement of a search term with a substitute term often results in the broadening of the search query.

Method 1000 begins with the receipt of a search query by refinement processor 64, at a query receipt step 1010. As mentioned above, a query consists of a one or more terms, each of which consists of one or more keywords. Although the query is typically displayed as a list of keywords, search system 10 typically stores the query as a collection of terms, each of which may include more than one keyword. For some applications, method 1000 processes multiple-keyword terms as term units, while for other applications, the method processes the individual keywords of the terms, without regard to their membership in terms. For some applications, before refinement processor 64 presents the refinement options, internal search processor 62 automatically executes a search of the query, while for other applications, the query is searched only if the user gives an instruction to execute the search, such as by clicking on search button 564 (FIG. 5 hereinabove, and FIGS. 13 and 14 hereinbelow).

At an anchor term designation step 1012, refinement processor 64 designates one or more of the terms of the query as anchors. The anchors are generally particularly meaningful terms in the query, for which the refinement processor does not offer replacement options. According to a first technique for designating the anchor terms, the refinement processor looks up the part of speech of each term in a lexical database, such as a dictionary or thesaurus, e.g., WordNet® (Princeton University, Princeton, N.J.). If the query includes at least one noun, the refinement processor designates one or more of the nouns as anchors. Typically, the refinement processor designates as anchors one or more nouns having the fewest number of synonyms in the lexical database, such as exactly one noun or exactly two nouns. For some applications, the refinement processor sets the number of anchors for a given query based on the number of terms in the query. Alternatively or additionally, the refinement processor identifies a first anchor, and decides whether to designate a second anchor based on the number of synonyms of the noun in the query have the second-fewest number of synonyms. The second noun is included as a second anchor only if the second noun has no more than a threshold number of synonyms, e.g., no more than one synonym, or no synonyms.

For some applications, for queries that include no nouns, the refinement processor identifies one or more verbs of the query as anchors, using the techniques described above for identifying nouns as anchors. For some applications, for queries that include neither nouns nor verbs, the refinement processor identifies one or more adjectives of the query as anchors, using the techniques described above for identifying nouns as anchors. Alternatively, the refinement processor has no preference for any part of speech, and identifies one or more terms of the query as anchors based on the number of synonyms, as described above for nouns. Further alternatively, the refinement processor ranks the parts of speech in another order of preference, such as first verbs, or first adjectives.

According to a second technique for designating the anchors, the refinement processor designates the anchors based on the number of hits returned by external search engine 40 (FIG. 1) for each of the terms individually. Typically, those terms returning the fewest number of hits are designated as anchors. As in the first technique described above, the refinement processor typically has an order of preference for different parts of speech, such as a preference first for nouns, then verbs, and finally adjectives. For some applications, the refinement processor uses this technique in combination with the first technique mentioned above, and/or the third technique mentioned below.

According to a third technique for designating the anchors, the refinement processor designates the anchors based on the association scores of each of the terms individually within one or more association graphs, such as the PAG of the user, appropriate TAGs (or merged TAGs), or the GAG, typically based on the user's indicated preference, as described hereinabove with reference to FIGS. 8-11. Typically, those terms having the highest association scores are designated as anchors. As in the first technique described above, the refinement processor typically has an order of preference for different parts of speech, such as a preference first for nouns, then verbs, and finally adjectives. For some applications, the refinement processor uses this technique in combination with the first and/or second techniques mentioned above.

Sometimes the refinement processor does not identify any anchors for a query. For example, the refinement processor may not designate any anchors for a query if all of the terms of the query have numerous synonyms, return many hits, or have high association scores, or if the query includes only a single term.

After designating the anchor terms, refinement processor 64 looks up, in the lexical database, one or more synonyms for each of the remaining non-anchor terms in the query, at a synonym lookup step 1014. These synonyms represent potential substitute terms for their respective non-anchor terms. For some applications, for non-anchor terms having more than one synonym, the refinement processor also retrieves a measure of strength of synonymy between each of the synonyms and the original term. At step 1016 below, the refinement processor uses only the synonyms having the greatest measures, such as the top one or two synonyms. Alternatively, the refinement processor uses all of the synonyms at step 1016 below.

At a candidate generation step 1016, the refinement processor generates a plurality of candidate replacement queries. Each of the candidate replacement queries includes all of the anchor terms designated at step 1012, and, for each of the non-anchor terms in the query, either the non-anchor term itself, or a synonym thereof, as identified at step 1014. The plurality of candidate replacement queries typically includes all of the permutations for replacing non-anchor terms with the synonyms identified at step 1014.

For example, for the query "pregnancy abstain food Chinese medicine," the refinement processor may:
designate "pregnancy" and "food" as anchor terms;
identify the terms "refrain," "forbear," and "avoid" as synonyms of the non-anchor term "abstain," and select "refrain" and "avoid" as potential substitute terms because they have the greatest strength of synonymy with "abstain";

identify the term "medication" as a synonym and potential substitute term for the non-anchor term "medicine"; and
identify no synonyms for "Chinese."

In this example, identified candidate replacement queries would typically include the following permutations:
"pregnancy refrain food Chinese medicine";
"pregnancy avoid food Chinese medicine";
"pregnancy abstain food Chinese medication";
"pregnancy refrain food Chinese medication"; and
"pregnancy avoid food Chinese medication."

At an association score calculation step 1018, the refinement processor calculates association scores of each of the candidate replacement queries within one or more association graphs, such as the PAG of the user, appropriate TAGs (or merged TAGs), or the GAG, typically based on the user's indicated preference, as described hereinabove with reference to FIGS. 8-11. Alternatively or additionally, the refinement processor ranks the candidate replacement queries responsively to a number of hits returned by external search engine 40 against each of the candidate replacement queries. For some applications, if the search query includes only a single term that has synonyms, the refinement processor checks the number of hits received by each of the synonyms using external search engine 40, and presents one or more of the synonyms responsively to the respective numbers of hits.

At a presentation step 1020, the refinement processor presents, as refinement options, one or more of the top scoring candidate replacement queries to user 30. Typically, the refinement processor presents between one and three replacement queries. For some applications, the refinement processor selects the number to present based on a measure of dominance among the scores of the candidates determined at step 1018. For example, if a single candidate replacement query has a dominant score, the refinement processor may decide to present only this candidate replacement query to the user as a refinement option.

The user selects one of the replacement queries (typically by clicking on it), at a refinement option selection step 1022. The current query is replaced with the selected replacement query, at a query replacement step 1024. For some applications, internal search processor 62 automatically executes a search of the refined query, while for other applications, the refined query is only searched if the user gives an instruction to execute the search, such as by clicking on search button 564. In either case, method 1000 typically generates new refinement options responsively to the refined query, by returning to step 1012.

Figure 13:
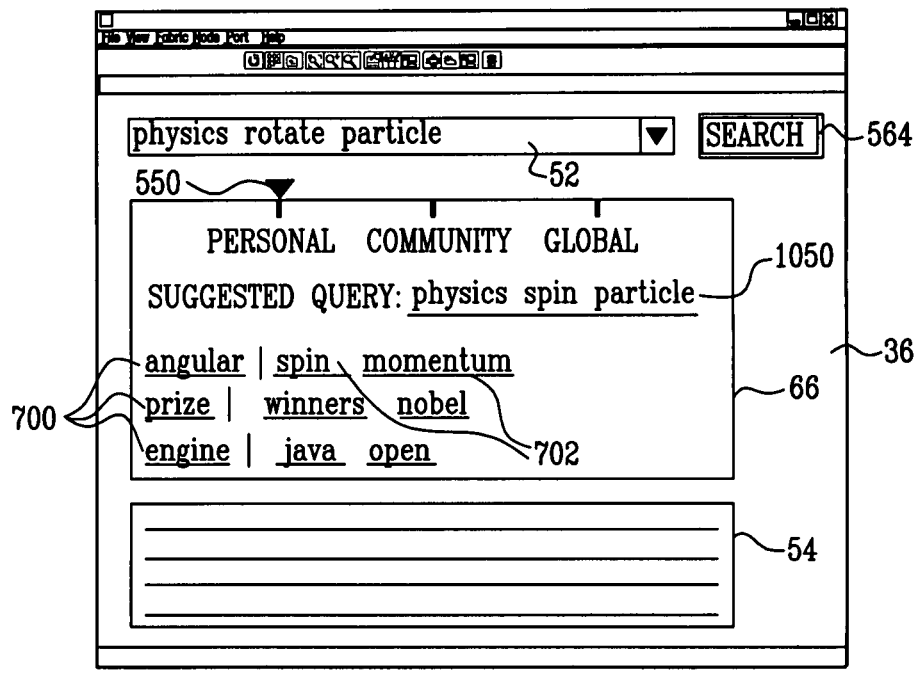
FIG. 13 is a schematic illustration of an exemplary screenshot of a browser including a suggested replacement query, in accordance with an embodiment of the present invention.

Reference is made to FIG. 13, which is a schematic illustration of an exemplary screenshot of browser 36 including a suggested replacement query 1050, in accordance with an embodiment of the present invention. In this embodiment, at presentation step 1020 of method 100 of FIG. 12, the refinement processor presents one or more replacement queries 1050 as hyperlinks. When the user clicks on one of the replacement queries, search field 52 is populated with the selected replacement query. Typically, refinement processor 64 presents both: (a) replacement queries 1050, and (b) the keyword-addition refinement options 66 described hereinabove with reference to FIGS. 8-20.

Figure 14:
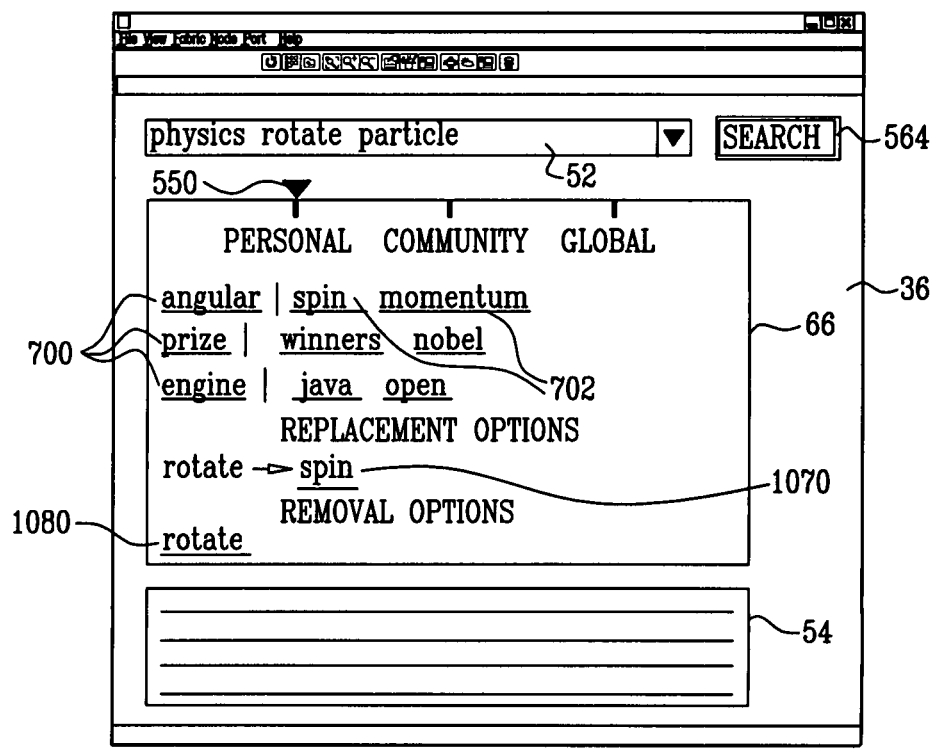
FIG. 14 is a schematic illustration of an exemplary screenshot of a browser including suggested replacement terms, in accordance with an embodiment of the present invention.

Reference is made to FIG. 14, which is a schematic illustration of an exemplary screenshot of browser 36 including suggested replacement terms 1070, in accordance with an embodiment of the present invention. In this embodiment, at presentation step 1020 of method 100 of FIG. 12, the refinement processor presents one or more of the synonyms identified at candidate generation step 1016, in association with the respective original query terms for which the synonyms are suggested replacements. For some applications, in order to decide which and/or how many such replacement terms to present, at step 1018 the refinement processor calculates separate association scores for the initial query with the substitution of each of the synonyms identified at step 1016. For some applications, the refinement processor presents one or more suggested replacement queries 1050, such as shown in FIG. 13, and one or more replacement terms 1070, as shown in FIG. 14. Replacement queries 1050 and replacement terms 1070 may represent the same or different substitutions.

In an embodiment of the present invention, refinement processor 64 alternatively or additionally presents term removal refinement options. Selection by the user of these suggested removal terms removes the terms from the search query. FIG. 14 shows an exemplary technique for displaying removal refinement options 1080. Typically, the refinement processor considers all non-anchor terms of the search query as candidates for removal. For some applications, the refinement processor selects for presentation to the user one or more of the query terms the inclusion of which in the search substantially reduces the number of hits returned by external search engine 40. Alternatively or additionally, the refinement processor selects for presentation to the user one or more of the query terms that has a weak association score with the other query terms within one or more association graphs, such as the PAG of the user, appropriate TAGs (or merged TAGs), or the GAG, typically based on the user's indicated preference, as described hereinabove with reference to FIGS. 8-11.

In an embodiment of the present invention, refinement processor 64 presents one or more of suggested replacement queries 1050, replacement terms 1070, and removal refinement options 1080 integrated with search results 54, such as in association with snippets, as described with reference to FIG. 20 of above-mentioned International Patent Application PCT/US07/67103, mutatis mutandis.

Non-Selection of Information

Reference is again made to FIGS. 8, 13, and 14. In an embodiment of the present invention, internal search processor 62 of search system 10 (FIG. 2) ranks the search results based in part on the non-selection of refinement options 66 presented to the user during the search process. Refinement options 66 typically include primary refinement options 700, secondary refinement options 702 for at least a portion of the primary refinement options, and/or suggested replacement terms 1070, as described hereinabove. Internal search processor 62 interprets the non-selection of one or more of these refinement options as an implicit indication that the user may lack interest in subject matter characterized by these refinement options. When ranking search results, internal search processor 62 lowers the rankings of results more strongly characterized by the non-selected refinement options.

For some applications, internal search processor 62 determines an importance of the non-selection of the refinement options based on the amount of time the user views the non-selected refinement options. The system attributes more importance to non-selected refinement options if the user views the non-selected refinement options for a longer amount of time before taking an action associated with the search, such as selecting other, more interesting information, such as another of the presented refinement options, or one of the search results, or entering a new search string.

For some applications, internal search processor 62 additionally attributes greater importance to the non-selection of a refinement option if the user selects another refinement option, rather than selecting no refinement option at all. The internal search processor may also take into consideration the position of the non-selected refinement options among the refinement options presented to the user, and the importance of the non-selected information indicated to the search user by the system. For example, the system may indicate the relative importance of refinement options by the font size or color, or by the classification of refinement options into primary refinement options 700 and secondary refinement options 702, as described hereinabove with reference to FIGS. 13 and 14.

Internal search processor 62 typically calculates a damping factor or score for each of the non-selected refinement options, which takes one or more of the following factors into consideration:

- the duration of the time period during which the non-selected refinement option was presented to the user, until the user selected another refinement option, submitted a search query, or, for cases in which search results are displayed in real time as the query is entered, selected one of the search results;
- the position of the non-selected refinement option in an ordering of the refinement options based on the presentation of the refinement options to the user. For example, if the refinement option are presented to the user as a simple list, the order may simply be the order of the list. If the refinements are presented as matrix, such as shown, for example, in FIG. 8, the order may be first by column, first by row, or diagonally, as described in the example hereinbelow with reference to FIGS. 3 and 8; and
- the emphasis of the non-selected refinement option among the refinement options, such as whether it is a primary or secondary refinement option, or whether it is emphasized by size or color.

In an embodiment of the present invention, internal search processor 62 ranks the search results based in part on the non-selection of search results 54 (FIGS. 8, 13, and 14) presented to the user during the search process (generally as a snippet including a title and excerpts from the document). Such non-selection generally occurs during a previous search by the same user (either during the same search session, or a previous search session for applications in which the system maintains a user profile, e.g., a PAG, for the user). Alternatively or additionally, the non-selection occurs during a search in which preliminary search results are displayed to the user in real time based on a partially-formed search query as the user enters keywords into the search field, as described hereinabove with reference to FIG. 6, or selects refinement options to develop the search query.

Internal search processor 62 interprets the non-selection of one or more of the presented search results as an implicit indication that the user may lack interest in subject matter characterized by these search results. When ranking search results, internal search processor 62 lowers the rankings of results more strongly characterized by the non-selected refinement options.

Internal search processor 62 considers terms (each of which comprises one or more keywords) appearing in one or more non-selected snippets (both titles and excerpts from the document) that are presented prior to the selected search result. Typically, the importance attributed to the non-selection of a term is positively associated with the frequency of the appearance of the term in the non-selected snippets. For some applications, the system does not attribute importance to the non-selection of a term appearing in prior snippets if the term also appears in the selected snippet.

For some applications, internal search processor 62 determines an importance of the non-selection of the search result based on the amount of time the user views the non-selected search results. The system attributes more importance to non-selected refinement options if the user views the non-selected search results for a longer amount of time before taking an action related to the search, such as selecting other, more interesting information, such as one of the presented refinement options, or another of the search results, or entering a new search string.

Internal search processor 62 typically calculates a damping factor or score for each of the non-selected terms, which takes one or more of the following factors into consideration:

- the duration of the time period during which the non-selected term was presented to the user, until the user selected one of the search results, advanced to a listing of more search results, selected a refinement option, or submitted a new search query;
- the position in the search results of the snippet that contains the non-selected term; typically, more importance is attributed to snippets that appear higher in the search results;
- whether the non-selected term appears in the title of a snippet, or the excerpt portion of the snippet; and
- how many times the non-selected term appears in the non-selected snippets; and
- whether the non-selected term appears in the selected snippet.

In an embodiment of the present invention, internal search processor 62 uses non-selection information (either of refinement options or search results) to rank search results subsequently or simultaneously presented to the user.

According to a first technique for ranking search results using non-selection information, internal search processor 62 updates a user's profile (e.g., PAG and/or SAG) to reflect negative associations derived from the non-selection of presented information, such as non-selected refinement options or non-selected search results. Such updating typically comprises:

- reducing an edge score or self-referential score of one or more terms in the PAG or SAG associated with the one or more non-selected terms, responsively to the damping factor or score of the non-selection, as described above; or
- creating a new edge and/or vertex with a negative value to reflect the non-selection information.

This modification of the PAG or SAG affects the ranking of search results performed by internal search processor 62 at subset result collection step 566 of method 560, described hereinabove with reference to FIG. 6. As described above, at step 566 the internal search processor generates a plurality of search engine queries. For searches for which the user has selected a personal-based preference for the ranking, some of these search engine queries comprise PAG-, hotspot- or SAG-based queries. The modification of the PAG or SAG thus influences the results of such queries, by deemphasizing results characterized by the terms in the PAG, hotspot, or SAG that are damped responsively to the non-selection information.

The modification of the PAG or SAG affects the ranking of search results of subsequent searches conducted within a search session, and the modification of the PAG affects the ranking of search results of subsequent searches conducted by the same user even in later search sessions. In addition, for applications in which search results are displayed in real time as the user builds a search query (e.g., by selecting refinement options, or manually modifying the search string), the modification of the PAG or SAG affects these displayed search results in real time.

In addition, the modification of the PAG or SAG may affect the ranking of search results of subsequent searches conducted by other users. As described hereinabove, some associations within a PAG are transferred to one or more TAGs associated with the user, and/or the GAG, typically via one or more hotspots of the user's PAG. For some applications, separate negative thresholds are provided for transferring negative associations in the user's PAG or SAG to TAGs and/or the GAG, typically via the user's hotspots.

Furthermore, the non-selected-information modification of the PAG or SAG influences the selection of refinement options 66, as described hereinabove with reference to FIGS. 8 and 9. The modification of the PAG or SAG also influences the outcome of other processes that use the information in the PAG or SAG.

An exemplary application of the techniques for learning from non-selection of refinement options described hereinabove is now provided with reference to FIGS. 3 and 8. Assume exemplary association graph 100 of FIG. 3 is a PAG, and refinement options 66 of FIG. 8 have been derived from this PAG in response to the query "physics." The refinement options in this example include:

| angular | spin | momentum | particle |
| prize | winners | nobel | |
| engine | java | open | |

The diagonal order of these refinement options is:
1. angular
2. prize
3. spin
4. engine
5. winners
6. momentum
7. java
8. Nobel
9. particle
10. open Assume that the ordered term vector is denoted as $\vec{V}$, and the length of $\vec{V}$ is denoted as $\|\vec{V}\|$. Time T is a variable representing the time spent viewing the suggested refinement options before performing any other action (such as submitting a search)

An exemplary method for calculate the damping factors separately for each term may use the following equation:

$$TDF = \sqrt{[T_{sec}(\|\vec{V}\| - Tp + 1) + 1]} \quad \text{(Equation 8)}$$

in which TDF=Term_damping_factor, and Tp=term position.

If we assume that the user observed the suggested refinement options for 5 seconds before performing any action (T=5), the damping factors for each term in $\vec{V}$ are calculated as:

| | |
|---|---|
| 1. angular | 7.14 |
| 2. prize | 6.78 |
| 3. spin | 6.4 |
| 4. engine | 6 |
| 5. winners | 5.57 |
| 6. momentum | 5.1 |
| 7. java | 4.58 |
| 8. Nobel | 4 |

-continued

| | |
|---|---|
| 9. particle | 3.32 |
| 10. open | 2.45 |

Each edge in the PAG may be damped, for example, by the average (e.g., geometric average) of the two vertices connected by the edge. For example, the edge angular-momentum in the PAG of FIG. 3 would be damped by $\sqrt{7.14 * 5.1} = 6.03$, so that the new edge score would be 30/6.03=4.97. Similarly, the edge java-open would be damped by $\sqrt{4.58 * 2.45} = 3.35$, resulting in a new edge score of 20/3.35=5.97.

An exemplary application of the techniques for learning from non-selection of search results described hereinabove is now provided with reference to FIG. 4 and FIGS. 15A-B and 16A-B, which show respective exemplary sets 1100 and 1102 of search results, in accordance with respective embodiments of the present invention. Assume exemplary association graph 100 of FIG. 4 is a PAG. The user submits the query "physics angular," is presented with set 1100 of search results (each of which comprises a snippet), shown in FIGS. 15A-B, and selects a snippet 1110 (the eighth snippet).

The feedback processor generates a list of top terms that are categories of the seven snippets of search results 1112 that appear higher than selected snippet 1110 (for example, the processor uses the "bag of words" technique described hereinabove for identifying which terms are categories). The two top terms in this example are 'angular momentum' and 'spin.' The feedback processor identifies the negative selection of these two terms that has implicitly been made by the user, and damps the edges of the PAG that link these terms to the query terms.

In accordance with an exemplary algorithm for performing this identification of negative selection and damping, the feedback processor calculates an importance score $tf_i$ in selected snippet 1110 for each of the terms of the generated categories (which, as mentioned above, in this example are 'angular momentum' and 'spin').

For example, to calculate $tf_i$ in a snippet s, the feedback processor may assign a score of 2 for each appearance of $t_i$ in the snippet's title, a score of 4 for each appearance of the term $t_i$ in the snippet's URL, and a score of 1 for each appearance of the term $t_i$ in the snippet's body. $tf_i$ equals the sum of these scores. In the present example, the tf for 'spin' in selected snippet 1110 equals 0 and the tf of 'angular momentum' in the selected snippet equals 4. More generally, the processor may assign a greater score to terms that appear in a snippet's title than to terms that appear in the snippet's body, and an even greater score to terms that appear in the snippet's URL.

If the tf of a term less than or equal to a minimal tf threshold, the processor damps the respective edges in the PAG between the term and each of the query terms, as explained immediately below. The minimal threshold typically varies based on whether the snippet comprises the entire document or only a short paragraph around the query terms. If the snippet comprises only a short paragraph around the query terms, as is in this example, a typical minimal if threshold would be zero; on the other hand, if the snippet contains a larger segment from the document, this threshold is typically greater.

In the present example, the tf of 'angular momentum' is greater than the minimal tf threshold (which equals 0), but the tf of 'spin' is less than or equal to the threshold. Thus, the respective edges between spin and each of the query terms would be damped. In the present example, 'spin' has two edges with the query terms: the edge spin-physics and the edge spin-angular. For some applications, in order to the damp the scores of these edges, the scores are multiplied by a positive number less than 1.

For some applications, a damping factor is calculated as inversely related (e.g., inversely proportional) to the term's inverse document frequency (idf) factor. For example, the idf for a term t may be calculated as follows:

$$idf = \log\frac{|D|}{|\{d : t \in d\}|} \quad \text{(Equation 9)}$$

where the numerator is the count of all snippets appearing in results 1112 higher than selected snippet 1110, and the denominator is the count of all snippets appearing in results 1112 higher than selected snippet 1100 that include the term t. In this example, the idf for 'spin' equals $\log(7/4)=0.243$.

If, for example, the calculated damping factor for 'spin' were 0.95, the score for the edge spin-angular would be damped from 114 to 108.3, and the score of the edge spin-physics would be damped from 54 to 51.3. It is to be noted that as the idf of a term increases, the calculated damping factor for the term decreases.

Alternatively or additionally, if the user is not satisfied with any of the presented search results, the user may request the presentation of additional search results (e.g., another page of search results), or modify the search query to produce a new result set. These two options are examples of actions the user may take during a search session after the user is presented with information in the response to a query. For some applications, if the user requests the presentation of additional search results, the feedback processor identifies terms that categorize all the search results (e.g., snippets) in the list of results presented to the user. For example, in exemplary results 1100 shown in FIGS. 15A-B, the top categorized terms are be 'angular momentum,' 'spin,' and 'particle.'

Before presenting the requested additional search results, the feedback processor analyzes the next batch of search results for the query, and finds the terms that categorize the search results (e.g., the snippets) in this batch. For example, assume that the next batch of search results includes results 1102 shown in FIGS. 16A-B. (As mentioned, these results have not been presented to the user, and ultimately will be probably be presented in a different order.) It is noted that the number of search results shown is exemplary. In this example, the terms that categorize this batch are 'angular momentum,' 'particle,' and 'quantum mechanics.'

The feedback processor compares the strength of categorization of each of the terms between search results 1100 presented to the user (FIGS. 15A-B) and search results 1102 in the next batch (FIGS. 16A-B), to identify terms that more strongly categorize search results 1100 than they do search results 1102. For example, performing such a comparison may comprise identifying all the terms that appear in the subtraction of the second set of terms from the first set of terms. In the present example, such a subtraction set includes the 'spin,' which negatively characterizes the search results 1102 compared to search results 1100.

For each of the one or more terms included in this negative set, the feedback processor damps the respective edges in the PAG that link any of these terms to the query terms, such as described above. In this example, the edges spin-angular and spin-physics would be damped. Typically, the feedback processor uses a weaker damping factor than is used in cases in which the user does select a search result, as described above.

As mentioned above, the system typically only applies such damping if the user viewed the non-selected results for a threshold amount of time, and/or adjusts the damping factors based on how long the user viewed the non-selected results.

The feedback processor ranks search results 1102, lowering the scores of results that are categorized by the identified negative terms, thereby assigning higher scores to other search results. The ranked search results are presented to the user.

For some applications, if the user modifies the search query (rather than requesting additional results), the feedback processor still performs the comparison between search results 1100 and 1102 described above, to determine damping factors for use for ranking the results of the modified search query and/or other future search results. In this case, the feedback processor typically assigns a weaker damping factor than in the case in which the user requests to view additional search results of the first query.

According to a second technique for ranking search results using non-selection information, internal search processor 62 modifies the DAG query score used for deriving ranking scores at step 574 of method 560, described hereinabove with reference to FIG. 6. Internal search processor 62 damps the DAG query scores of DAGs that include non-selected terms, based on the terms damping factors or values.

According to a third technique for ranking search results using non-selection information, internal search processor 62 modifies the "bag of words" ranking technique, described hereinabove with reference to FIG. 7, to reflect negative associations derived from the non-selection of presented information, such as non-selected refinement options or non-selected search results. At term scoring step 604 of method 600, the processor reduces the scores of some of the terms based on the damping factor or score calculated for the terms because of non-selection.

According to a fourth technique for ranking search results using non-selection information, internal search processor 62 modifies the LSA ranking technique described hereinabove to reflect negative associations derived from the non-selection of presented information, such as non-selected refinement options or non-selected search results. The importance of terms identified in the LSA ranking process is damped based on the damping factor or value calculated for the terms because of non-selection.

According to a fifth technique for ranking search results using non-selection information, internal search processor 62 modifies the LDA ranking technique described hereinabove to reflect negative associations derived from the non-selection of presented information, such as non-selected refinement options or non-selected search results. The calculated correlation scores are damped if one or more of the topics associated with the snippets contains the damped term, and/or if the snippets contain the damped terms.

For some applications, all of the damping techniques described herein are alternatively or additionally applied to other association graphs, such as SAGs, TAGs, GRAGs, and the GAG. Furthermore, in embodiments described herein in which internal search processor 62 is described as performing damping based on the content of snippets of the search results, for some applications the processor alternatively or additionally performs the damping based on the content of the full text of the search result document if the full text is available to the processor.

The Advertisement Processor

In an embodiment of the present invention, advertisement processor 70 of online processor 60 provides advertisement services, via web server 22 in advertisement area 72 in browser 36 (FIG. 2). Alternatively or additionally, the advertisements are integrated with search results 54, and/or displayed in a popup window, as is known in the art, or using other advertising display techniques known in the art. The advertising processor uses advertisement search and ranking techniques similar to those used for ranking document search results, as described hereinabove.

In some embodiments of the present invention, search system 10 uses only association graphs (e.g., PAGs, TAGs, and DAGs) that are characterized by a certain level of maturity, which may be measured, for example, by the number of edges of the association graph, or a total association score of the association graph. Immature association graphs generally do not provide meaningful information, so they are not used until they collect sufficient information over time.

In some embodiments of the present invention, search system 10 uses profiles that do not comprise association graphs, such as lists (e.g., ranked lists), vectors, sets of sets, and a non-associative multi-dimensional matrix (e.g., three or more dimensions). For example, the system may use personal profiles that do not comprise PAGs, topic profiles that do not comprise TAGs, document profiles that do not comprise DAGs, global profiles that do not comprise GAGs, and/or group profiles that do not comprise GRAGs.

The word "document," as used in the present application, including the claims, is to be understood broadly as referring to any digital unit of information, including, but not limited to, files (e.g., containing text, media, or hyperlinks), Web pages, newsgroup postings, and e-mails, which can be stored electronically on a computer or a network.

In some embodiments of the present invention, the search techniques described herein are combined with contextual search techniques known in the art.

Techniques of embodiments of the present invention typically improve the efficiency of searching, and conserve the use of computer resources.

The scope of the present invention includes embodiments described in the following applications, which are assigned to the assignee of the present application and are incorporated herein by reference. In an embodiment, techniques and apparatus described in one or more of the following applications are combined with techniques and apparatus described herein:

International Patent Application PCT/US07/67103, filed Apr. 20, 2007, entitled, "Search techniques using association graphs";

U.S. patent application Ser. No. 11/633,461, filed Dec. 5, 2006, entitled, "A multi-directional and auto-adaptive relevance and search system and methods thereof";

U.S. Provisional Patent Application 60/793,253, filed Apr. 20, 2006, entitled, "Methods for using association graphs in search engines";

U.S. Provisional Patent Application 60/796,188, filed May 1, 2006, entitled, "Apparatus and methods thereof for search engine personalization";

U.S. Provisional Patent Application 60/829,136, filed Oct. 11, 2006, entitled, "Apparatus and methods thereof for search phrase refinement";

U.S. Provisional Patent Application 60/829,135, filed Oct. 11, 2006, entitled, "Apparatus and methods thereof for using explicit query refinements to tune search results ranking factors";

U.S. Provisional Patent Application 60/829,132, filed Oct. 11, 2006, entitled, "Apparatus and methods thereof for adaptive ranking mechanism using association graphs and contextual analysis";

U.S. Provisional Patent Application 60/886,193, filed Jan. 23, 2007, entitled, "Multi-directional and auto-adaptive relevance and search system and methods thereof";

U.S. Provisional Patent Application 60/887,580, filed Jan. 31, 2007, entitled, "Searchable banner display and apparatus that enables exploring destination content prior to reaching it";

U.S. Provisional Patent Application 60/741,902, filed in January 2006, entitled, "A multi-directional and auto-adaptive relevance and search system and methods thereof"; and U.S. patent application Ser. No. 11/846,213, filed Aug. 28, 2007, entitled, "Search phrase refinement by search term replacement."

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method comprising:

constructing an association graph that includes one or more terms as vertices linked by edges, which edges have respective edge scores that represent respective strengths of association of the respective vertices linked thereby;

receiving from a user a search query that comprises one or more of the terms of the association graph;

responsively to the search query, generating, using the association graph, refinement options that comprise respective terms of the association graph, and presenting information to the user, including the refinement options for optional addition to the search query;

identifying a portion of the refinement options, and corresponding terms, that the user did not select;

using the association graph, assigning respective ranking scores to search results generated responsively to the search query, including lowering one or more of the ranking scores of the respective search results that are characterized by the non-selected portion of the refinement options, by damping the edge score of an edge of the association graph between two of the vertices respectively representing two of the non-selected terms;

ranking the search results according to the ranking scores; and presenting the ranked search results to the user.

2. The method according to claim 1, wherein identifying the non-selected portion comprises identifying the non-selected portion without receiving explicit feedback from the user regarding a level of interest of the user in the non-selected portion.

3. The method according to claim 1, wherein receiving the search query comprises receiving a first search query from the user, wherein presenting the information comprises presenting the information including first search results generated responsively to the first search query, and the refinement options, wherein the method further comprises receiving a second search query from the user after receiving the first search query, wherein assigning the respective ranking scores comprises assigning the respective ranking scores to second search results generated responsively to the second search query, including lowering one or more of the ranking scores of the respective second search results that are characterized by the non-selected portion of the refinement options, wherein ranking the search results comprises ranking the second search results, and wherein presenting the ranked search results comprises presenting the second ranked search results.

4. The method according to claim 3, wherein receiving the second search query comprises receiving the second search query during a search session during which the first query was received.

5. The method according to claim 3, wherein receiving the second search query comprises receiving the second search query during a later search session after a search session during which the first query was received.

6. The method according to claim 1, wherein the search query includes a first search query, wherein the user is a first user, wherein the ranking scores include first ranking scores, and wherein the search results include first search results, and comprising:

receiving a second search query from a second user;

assigning respective second ranking scores to second search results generated responsively to the second search query, including lowering one or more of the second ranking scores of the respective second search results that are characterized by the portion of the information presented to and not selected by the first user;

ranking the second search results according to the second ranking scores; and presenting the ranked second search results to the second user.

7. The method according to claim 1, wherein lowering comprises attributing greater importance to the non-selection of the portion of the refinement options if the user views the non-selected portion for a longer amount of time.

8. The method according to claim 1, wherein lowering the ranking scores comprises attributing greater importance to the non-selection of the portion of the refinement options if the user selects another of the presented refinement options, rather than selecting none of the presented refinement options.

9. The method according to claim 1, wherein presenting the information to the user responsively to the search query comprises displaying the search results in real time as the query is entered by the user.

10. The method according to claim 1, wherein identifying the portion comprises after receiving an indication that the user takes an action related to the search session, identifying the portion of the refinement options that the user did not select prior to taking the action.

11. The method according to claim 10, wherein the action is selected from the group consisting of: selecting one of the refinement options, selecting a portion of the information, submitting the search query, modifying the search query, and requesting additional search results for the search query.

12. The method according to claim 1, wherein generating the refinement options comprises selecting as the refinement options a portion of respective terms of the association graph directly linked to the terms of the search query by respective edges of the association graph.

13. The method according to claim 12, wherein the refinement options comprise primary and secondary refinement options, wherein generating the refinement options comprises:

selecting as the primary refinement options a portion of the respective terms of the association graph directly linked to the terms of the search query by respective edges of the association graph; and for each of at least a portion of the primary refinement options, selecting as the secondary refinement options a portion of the respective terms of the association graph that are (a) directly linked to the terms of the search query by respective edges of the association graph, and (b) directly linked to the term of the primary refinement option by respective edges of the association graph, and wherein presenting the refinement options comprises presenting the primary refinement options, and the secondary refinement options for the at least the portion of the primary refinement options.

14. The method according to claim 1, wherein the association graph comprises a personal association graph of the user, which represents interactions of a plurality of documents with the user during one or more searches conducted during one or more search sessions.

15. The method according to claim 1, wherein the association graph comprises a session association graph, which represents interactions of one or more documents with the user during one or more searches conducted by the user during a single search session.

16. The method according to claim 1, wherein generating the refinement options comprises generating: (a) primary refinement options that are most closely related to the search query, and (b) for at least a portion of the primary refinement options, secondary refinement options, which are more distantly related to the search query, and are also related to their associated primary refinement option, and wherein presenting the refinement options comprises presenting the primary refinement options, and the secondary refinement options for the at least the portion of the primary refinement options.

17. Apparatus comprising:

an interface; and a processor, which is configured to construct an association graph that includes one or more terms as vertices linked by edges, which edges have respective edge scores that represent respective strengths of association of the respective vertices linked thereby; receive from a user, via the interface, a search query that comprises one or more of the terms of the association graph; responsively to the search query, generate, using the association graph, refinement options that comprise respective terms of the association graph, and present, via the interface, information to the user, including refinement options for optional addition to the search query; identify a portion of the refinement options, and corresponding terms, that the user did not select; using the association graph, assign respective ranking scores to search results generated responsively to the search query, including lowering one or more of the ranking scores of the respective search results that are characterized by the non-selected portion of the refinement options, by damping the edge score of an edge of the association graph between two of the vertices respectively representing two of the non-selected terms; rank the search results according to the ranking scores; and present the ranked search results to the user, via the interface.

18. The apparatus according to claim 17, wherein the processor is configured to identify the non-selected portion without receiving explicit feedback from the user regarding a level of interest of the user in the non-selected portion.

19. The apparatus according to claim 17, wherein the processor is configured to identify the portion after receiving, via the interface, an indication that the user takes an action related to the search session, the action selected from the group consisting of: selecting one of the refinement options, selecting a portion of the information, submitting the search query, modifying the search query, and requesting additional search results for the search query.

20. The apparatus according to claim 17, wherein the processor is configured to attribute greater importance to the non-selection of the portion of the refinement options if the user views the non-selected portion for a longer amount of time.

21. The apparatus according to claim 17, wherein the processor is configured to lower the ranking scores by attributing greater importance to the non-selection of the portion of the refinement options if the user selects another of the presented refinement options, rather than selecting none of the presented refinement options.

22. The apparatus according to claim 17, wherein the processor is configured to generate the refinement options by selecting as the refinement options a portion of respective terms of the association graph directly linked to the terms of the search query by respective edges of the association graph.

23. The apparatus according to claim 17, wherein the processor is configured to:
generate the refinement options by generating: (a) primary refinement options that are most closely related to the search query, and (b) for at least a portion of the primary refinement options, secondary refinement options, which are more distantly related to the search query, and are also related to their associated primary refinement option, and
present the primary refinement options, and the secondary refinement options for the at least the portion of the primary refinement options.

24. A computer software product, comprising a non-transitory tangible computer-readable medium in which program instructions are stored, which instructions, when read by a computer, cause the computer to construct an association graph that includes one or more terms as vertices linked by edges, which edges have respective edge scores that represent respective strengths of association of the respective vertices linked thereby; receive from a user a search query that comprises one or more of the terms of the association graph; responsively to the search query, generate, using the association graph, refinement options that comprise respective terms of the association graph, and present information to the user, including refinement options for optional addition to the search query; identify a portion of the refinement options, and corresponding terms, that the user did not select; using the association graph, assign respective ranking scores to search results generated responsively to the search query, including lowering one or more of the ranking scores of the respective search results that are characterized by the non-selected portion of the refinement options, by damping the score of an edge of the association graph between two of the vertices respectively representing two of the non-selected terms; rank the search results according to the ranking scores; and present the ranked search results to the user.

25. The computer software product according to claim 24, wherein the instructions, when read by the computer, cause the computer to identify the non-selected portion without receiving explicit feedback from the user regarding a level of interest of the user in the non-selected portion.

26. The computer software product according to claim 24, wherein the instructions, when read by the computer, cause the computer to identify the portion after receiving an indication that the user takes an action related to the search session, the action selected from the group consisting of: selecting one of the refinement options, selecting a portion of the information, submitting the search query, modifying the search query, and requesting additional search results for the search query.

27. The computer software product according to claim 24, wherein the instructions, when read by the computer, cause the computer to attribute greater importance to the non-selection of the portion of the refinement options if the user views the non-selected portion for a longer amount of time.

28. The computer software product according to claim 24, wherein the instructions, when read by the computer, cause the computer to lower the ranking scores by attributing greater importance to the non-selection of the portion of the refinement options if the user selects another of the presented refinement options, rather than selecting none of the presented refinement options.

* * * * *